United States Patent
Chou et al.

(10) Patent No.: US 10,280,334 B2
(45) Date of Patent: May 7, 2019

(54) POLYIMIDES, COATING COMPOSITION FORMED THEREFROM AND USE THEREOF

(71) Applicant: Eternal Materials Co., Ltd., Kaoshing (TW)

(72) Inventors: Meng-Yen Chou, Kaohsiung (TW); Chung-Jen Wu, Kaohsiung (TW)

(73) Assignee: Eternal Materials Co., Ltd., Kaohsiung (TW)

( * ) Notice: Subject to any disclaimer, the term of this patent is extended or adjusted under 35 U.S.C. 154(b) by 125 days.

(21) Appl. No.: 14/141,810

(22) Filed: Dec. 27, 2013

(65) Prior Publication Data

US 2014/0228512 A1  Aug. 14, 2014

(30) Foreign Application Priority Data

Feb. 8, 2013 (TW) .............................. 102105405 A

(51) Int. Cl.
*C09D 179/08* (2006.01)
*C08G 73/10* (2006.01)

(52) U.S. Cl.
CPC ............ *C09D 179/08* (2013.01); *C08G 73/10* (2013.01); *C08G 73/106* (2013.01); *C08G 73/1039* (2013.01)

(58) Field of Classification Search
CPC .. C09D 179/08; C08G 73/10; C08G 73/1039; C08G 73/1057; C08G 73/106; C08G 73/1067; C08G 73/1075
USPC ........................................................ 524/600
See application file for complete search history.

(56) References Cited

U.S. PATENT DOCUMENTS

| | | | | |
|---|---|---|---|---|
| 3,437,636 A | * | 4/1969 | Angelo | C08G 18/6438 528/184 |
| 4,489,185 A | * | 12/1984 | Schoenberg | C08G 73/10 524/104 |
| 4,519,941 A | * | 5/1985 | Anderson | C08L 63/00 252/514 |
| 5,756,650 A | * | 5/1998 | Kawamonzen | C08G 73/1007 428/395 |
| 8,105,752 B2 | | 1/2012 | Chou et al. | |
| 8,754,186 B2 | | 6/2014 | Fujihara et al. | |
| 2007/0248910 A1 | * | 10/2007 | Kimura | C08G 73/14 430/283.1 |
| 2009/0264572 A1 | * | 10/2009 | Liao | C09D 7/1216 524/423 |
| 2010/0084171 A1 | * | 4/2010 | Fujihara | C08G 73/1007 174/258 |
| 2010/0132989 A1 | * | 6/2010 | Fujihara | C08G 18/10 174/258 |

FOREIGN PATENT DOCUMENTS

| | | |
|---|---|---|
| CN | 101407589 A | 4/2009 |
| CN | 101578320 A | 11/2009 |
| JP | 2008197544 A | 8/2008 |
| JP | 2010150506 A | 7/2010 |
| JP | 2012102296 A | 5/2012 |
| WO | WO-2007083526 A1 | 7/2007 |

* cited by examiner

*Primary Examiner* — Jane L Stanley

(74) *Attorney, Agent, or Firm* — Drinker Biddle & Reath LLP

(57) ABSTRACT

A polyimide (PI) having two —COOH capping groups at each end is provided. A coating composition is further provided, which contains the PI and a hardening agent having 2 to 6 functional groups capable of reacting with —COOH. A PI coating layer and PI film formed by the coating composition of the present invention possess excellent chemical resistance and coefficient of thermal expansion (CTE), which makes them applicable in fabrication of protective materials for active/passive devices, optical materials, touch panels, copper foil substrates, soft flexible electronic materials or integrated circuit elements, or film substrate for glass film touch panels.

10 Claims, No Drawings

POLYIMIDES, COATING COMPOSITION FORMED THEREFROM AND USE THEREOF

BACKGROUND OF THE INVENTION

Field of the Invention

The present invention relates to a polyimide (PI) having two —COOH capping groups at each end, a coating composition formed from the PI, and a flexible device using the coating composition.

Description of the Prior Art

A PI refers to a compound having a functional group of the following formula:

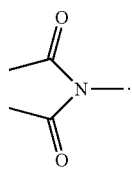

Since a PI has excellent thermal stability, and a film formed by a PI usually has good mechanical, electrical, and chemical properties, it is the first choice for high-performance polymeric materials.

In the semi-conductor industry, PI is widely applied in passive films, stress buffer films, α particle shielding films, dry etching protective covers, micro-electro-mechanical systems and interlayer insulating films. PI may also be used in electronic packages, enamel wires, printed circuit boards, sensing elements, and separating films. PI may also be used in thermosetting low-temperature hardening protective materials for active/passive devices, optical materials, touch panels, copper foil substrates, soft flexible electronic materials or integrated circuit elements.

Commonly seen PI can be classified as an uncyclized PI precursor, that is, a polyamic acid (PAA) PI, or a cyclized soluble polyimide (SPI). Currently, a reaction scheme for preparing the PAA PI may be briefly described as follows:

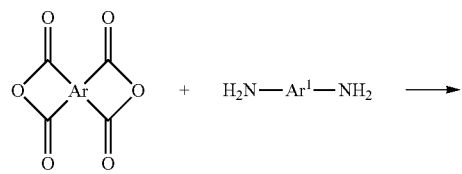

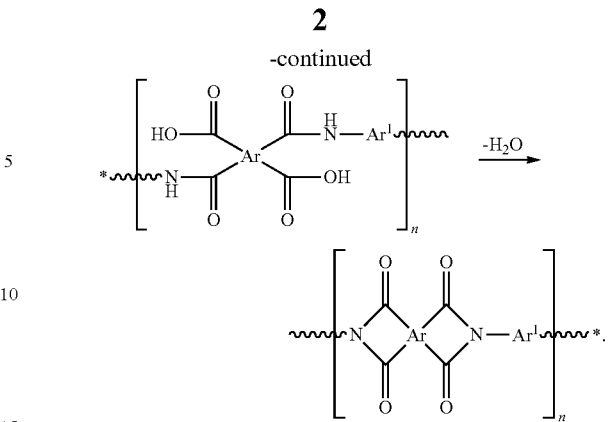

In the aforementioned preparation method, a diamine monomer is dissolved in a polar aprotic solvent, and then equimolar dianhydride monomer is added. Then, condensation is carried out so as to form a PI precursor, that is, PAA. Next, imidization of the PAA is carried out through heating, and after condensation, dehydration, and cyclization, the PAA is converted into the PI. The preparation method has a disadvantage that 100% imidization can only be achieved through heating over a long duration (generally, heating for several hours) at a high temperature of about 350° C. If the molecular weight of PAA obtained at the first stage does not reach a certain level (that is, the molecular weight is excessively low), a PI film having good physical properties cannot be obtained after imidization. However, if the molecular weight of the PAA obtained at the first stage is excessively high, the viscosity is too high, resulting in disadvantages such as poor operability and poor leveling property during coating. For example, when spin coating is performed, unleveling phenomena such as a convex center and thick edges would easily occur. Moreover, if the molecular weight of PAA is excessively high, when a second stage of imidization is performed, an extremely large internal stress is generated due to interaction between molecules and shortened bond length of a molecular chain, so that the coated substrate is bent and deformed.

Because the cyclized SPI has been imidized, it has a low thermosetting temperature (<270° C.) and excellent thermal stability. In order to improve the physical properties, the cyclized SPI usually has an active group at a capping site, so that thermosetting polymerization can be carried out. An example of the SPI is as follows:

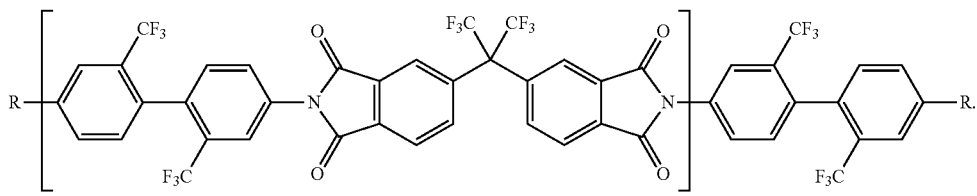

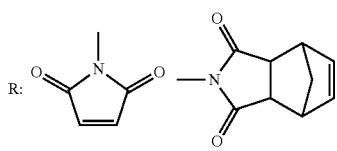

However, during thermosetting of the SPI, a rigid structure is formed, and the SPI becomes brittle; moreover, after cross-linking, the cross-linking density is low, and the chemical resistance is poor.

Another example of the SPI is as follows:

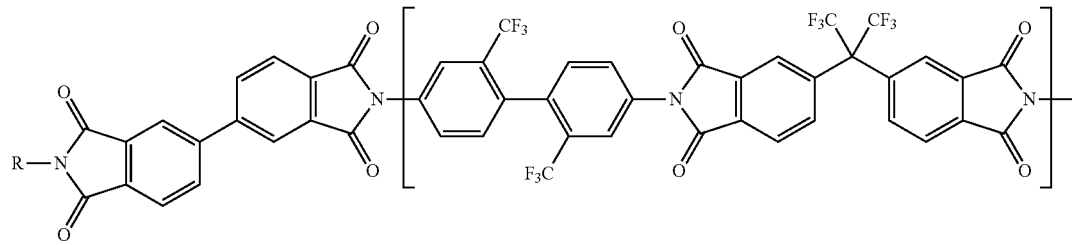

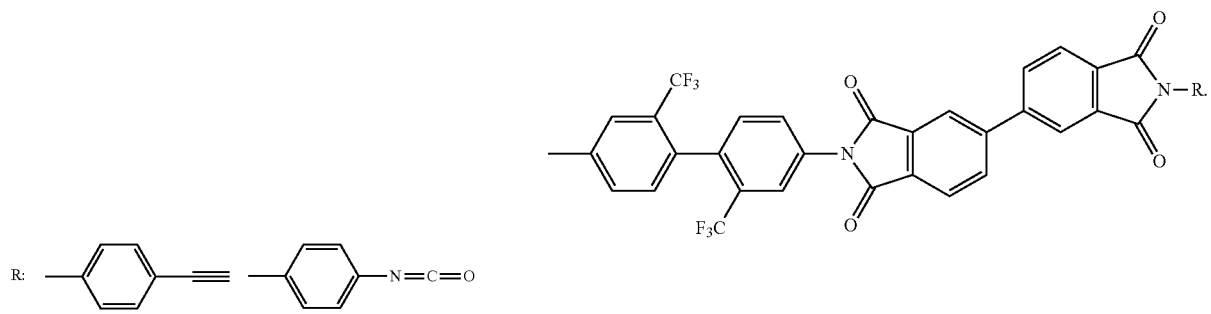

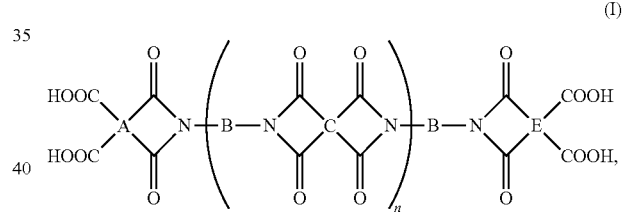

The SPI has good reactivity when being heated. However, due to a structure problem of the SPI (i.e., it has a triple bond and an N=C=O group), during thermosetting of the SPI, a rigid structure is also formed, and the SPI becomes brittle and is prone to yellowing, thus resulting in a reliability problem.

The commonly arising conflict between material characteristics and operability makes it difficult for persons engaged in PI research to achieve a balance between these needs. Currently, there is still industry demand for a PI with improved physical properties (especially chemical resistance and excellent thermal properties, for example, a low CTE).

SUMMARY OF THE INVENTION

In order to solve the above problem, one of the main objectives of the present invention is to provide an SPI having two —COOH capping groups at each end.

Another objective of the present invention is to provide a coating composition which contains the aforementioned PI and a hardening agent having 2 to 6 functional groups capable of reacting with —COOH. A PI coating layer or PI film formed by the coating composition of the present invention has excellent chemical resistance and thermal properties, is resistant to yellowing, has good transparency, and can be used as a protective material of an element or a film substrate for replacing glass.

DETAILED DESCRIPTION OF THE INVENTION

The PI of the present invention has a structure represented by Formula (I):

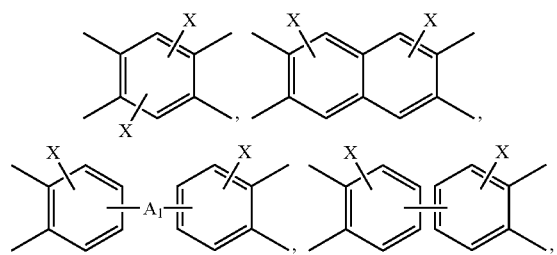

where:
A, C, and E may be the same or different and are each independently a tetravalent organic group, and if n is greater than 1, each C may be the same or different tetravalent organic group;
each B may be the same or different, and is independently a divalent organic group; and
n is an integer greater than 0.

Preferably, A, C, and E are respectively a tetravalent organic group selected from the group consisting of the following groups:

-continued

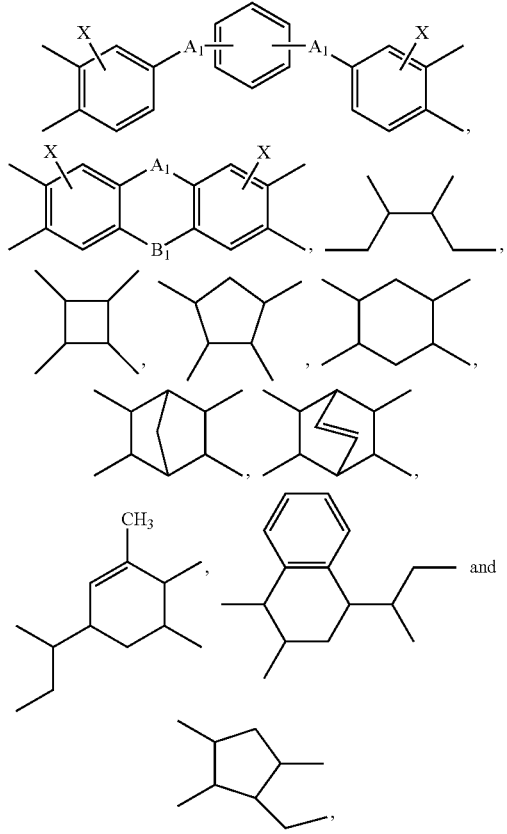

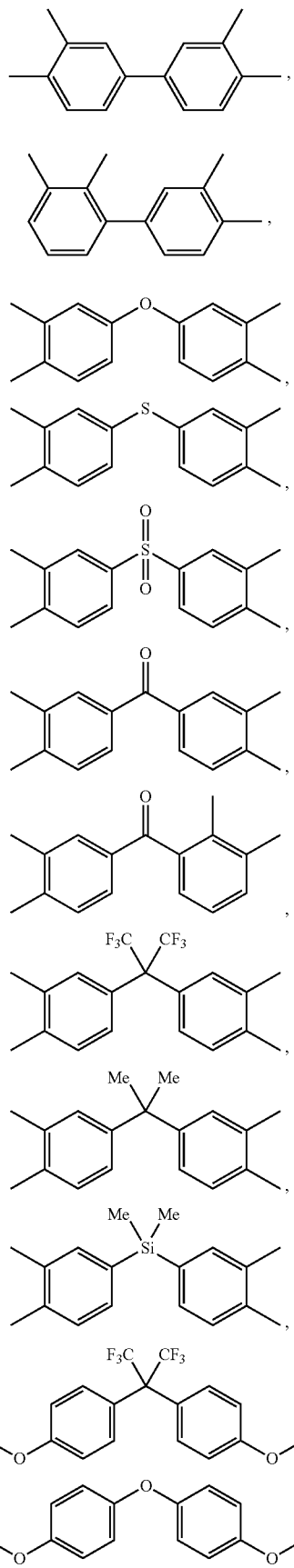

where:
each X is independently hydrogen, halogen, a linear or branched $C_1$-$C_4$ perfluoroalkyl group, or a linear or branched $C_1$-$C_4$ alkyl group; and $A_1$ and $B_1$ are each independently a covalent bond, a linear or branched $C_1$-$C_4$ alkyl group, a linear or branched $C_1$-$C_4$ perfluoroalkyl group, an alkoxy group, silanyl, oxygen, sulfur, carbonyl, a carboxylate group, sulfonyl, phenyl, biphenyl, fluorenyl, or

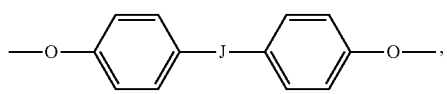

where J is —O—, —$SO_2$—, —$CH_2$—, —$C(CF_3)_2$, or —$C(CH_3)_2$.

More preferably, A, C, and E are respectively a tetravalent organic group selected from the group consisting of the following groups:

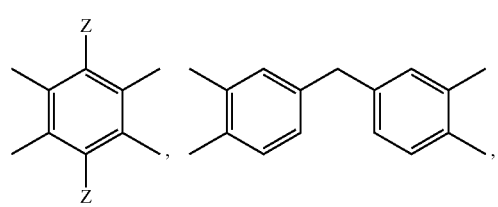

-continued
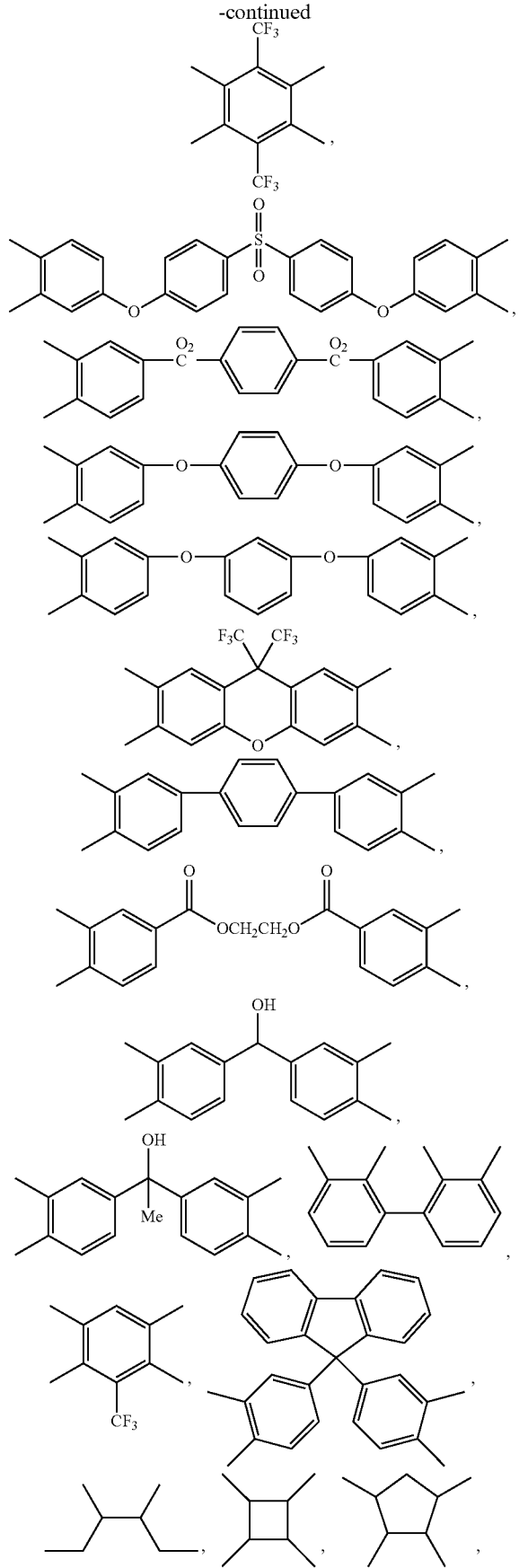
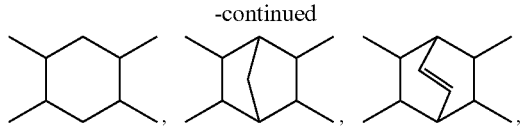
where Z is hydrogen or halogen.
Especially preferably, A, C, and E are respectively a tetravalent organic group selected from the group consisting of the following groups:
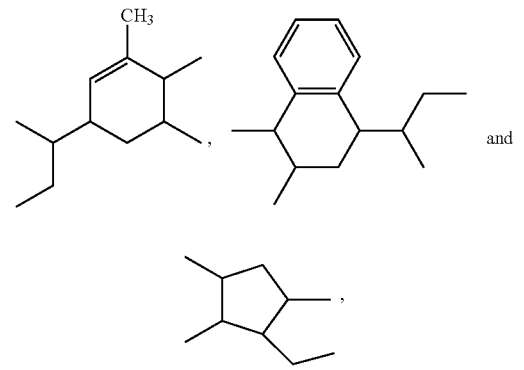
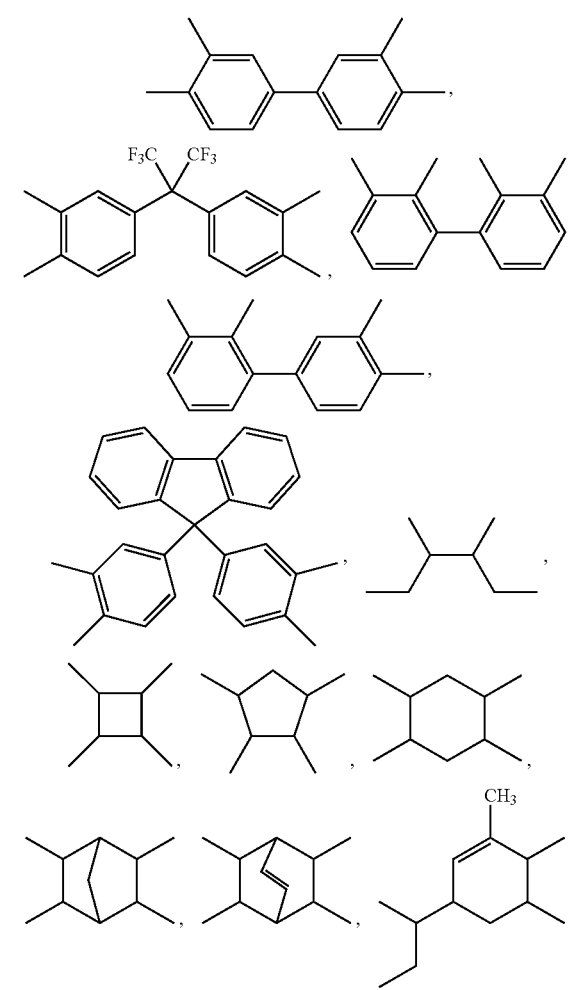

-continued

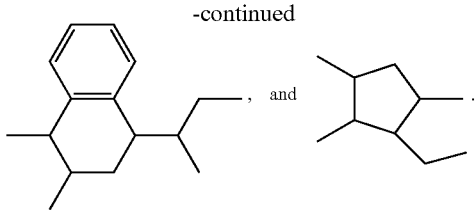

Preferably, B is respectively a divalent organic group selected from the group consisting of the following groups:

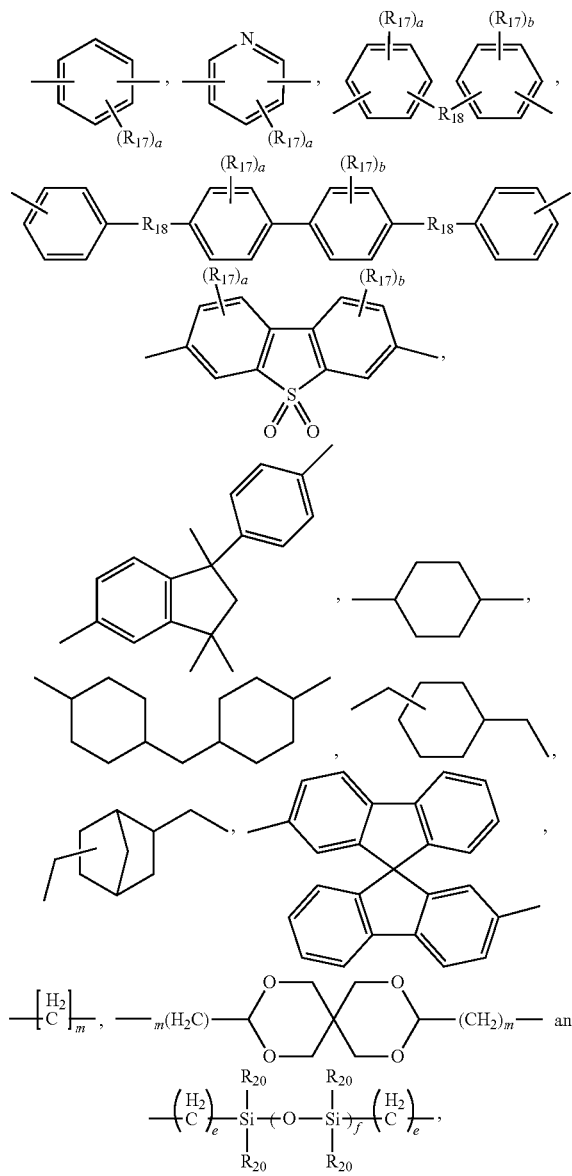

where:
each $R_{17}$ is independently H, a $C_1$-$C_4$ alkyl group, a $C_1$-$C_4$ perfluoroalkyl group, methoxy, ethoxyl, halogen, —OH, —COOH, —NH$_2$ or —SH;
each a is independently an integer of 0 to 4;
each b is independently an integer of 0 to 4; and
$R_{18}$ is a covalent bond or a group selected from the following groups:

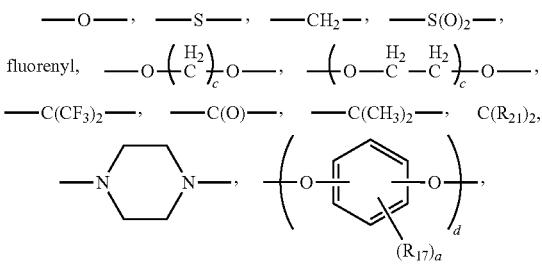

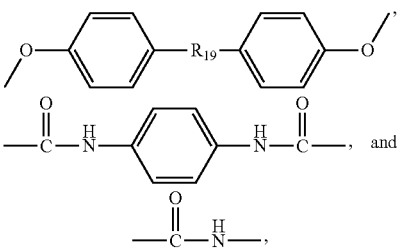

where:
c and d are each independently an integer of 0 to 20;
$R_{17}$ and a are as defined above;
$R_{19}$ is —S(O)$_2$—, —C(O)—, a covalent bond, or a linear or branched $C_1$-$C_{18}$ alkyl group;
each $R_{20}$ is independently H, methyl, ethyl, or phenyl;
each $R_{21}$ is independently a $C_1$-$C_{20}$ alkyl group or a cyclic alkyl group;
each m is independently an integer of 1 to 20; and
e and f are each independently an integer greater than 0.

More preferably, B is respectively a divalent organic group selected from the group consisting of the following groups:

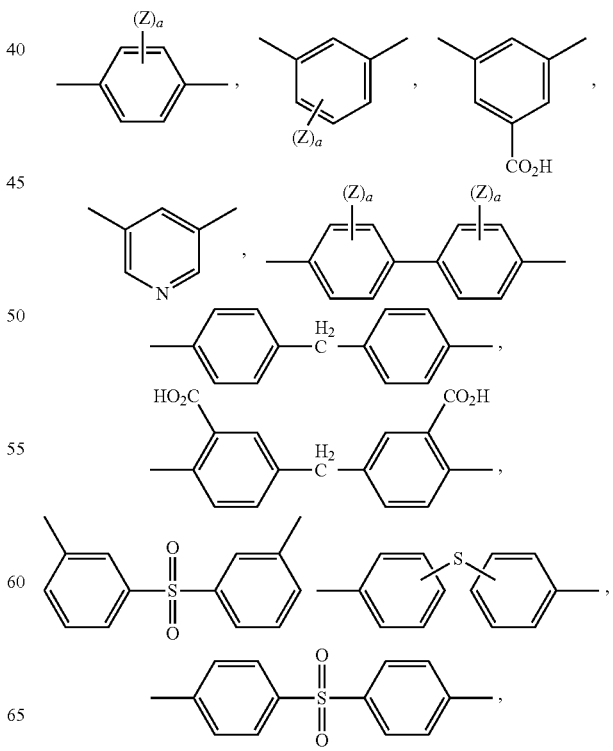

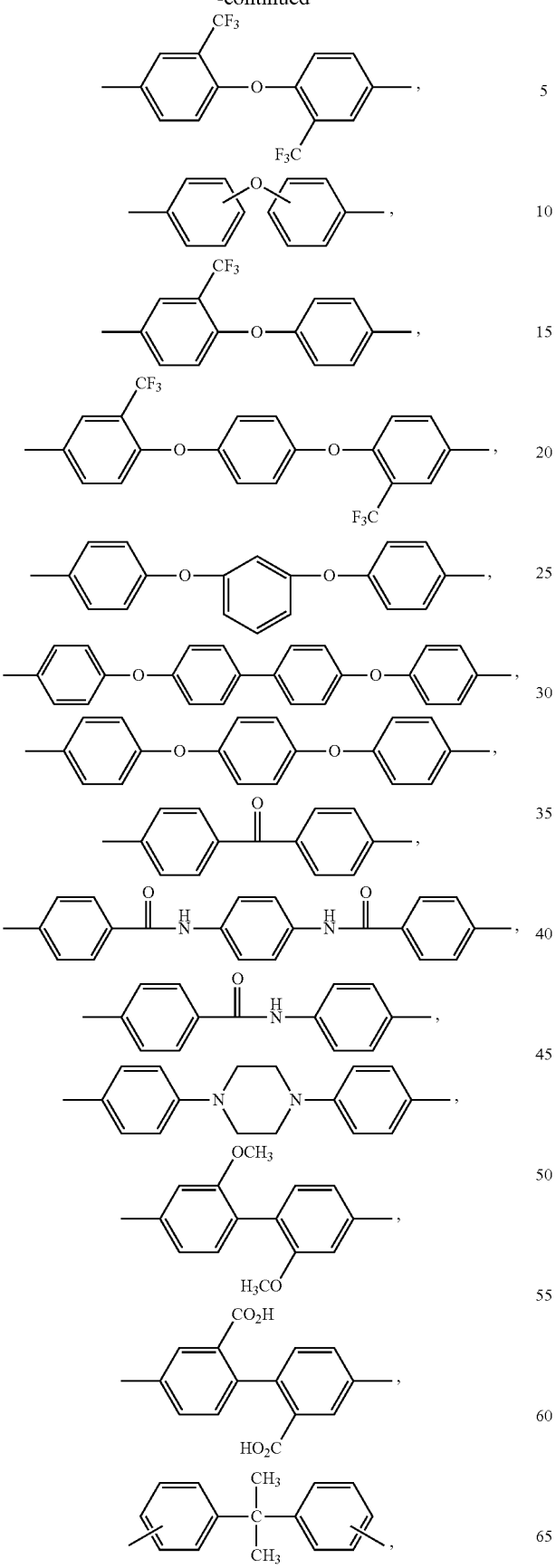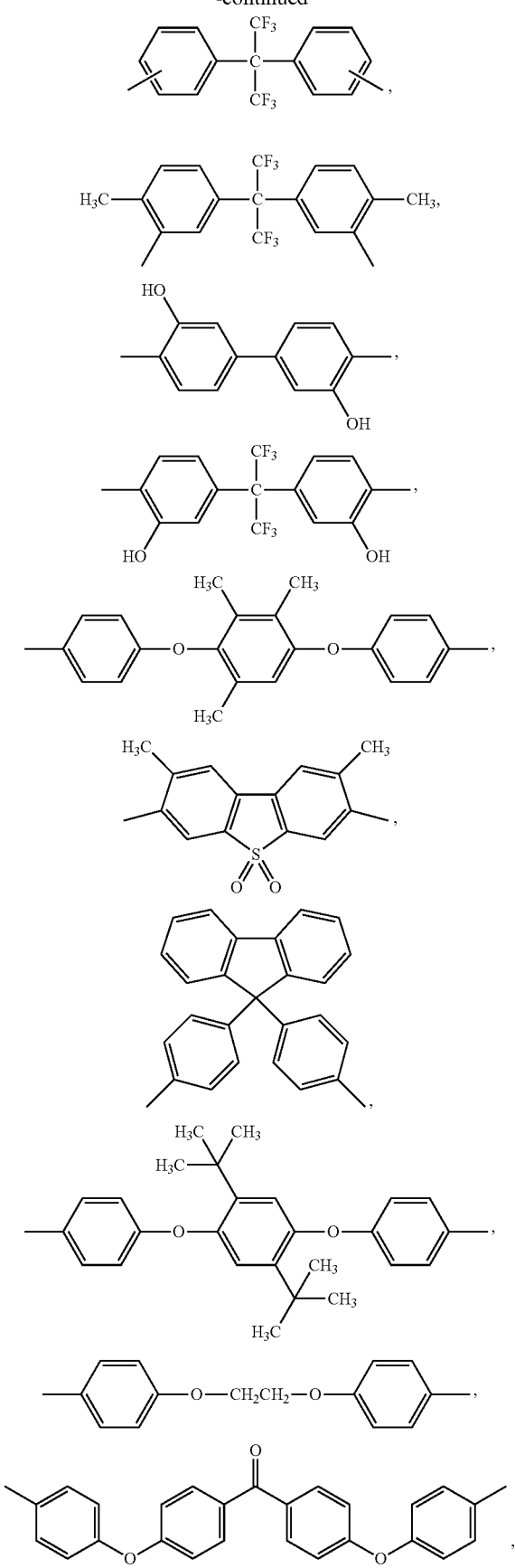

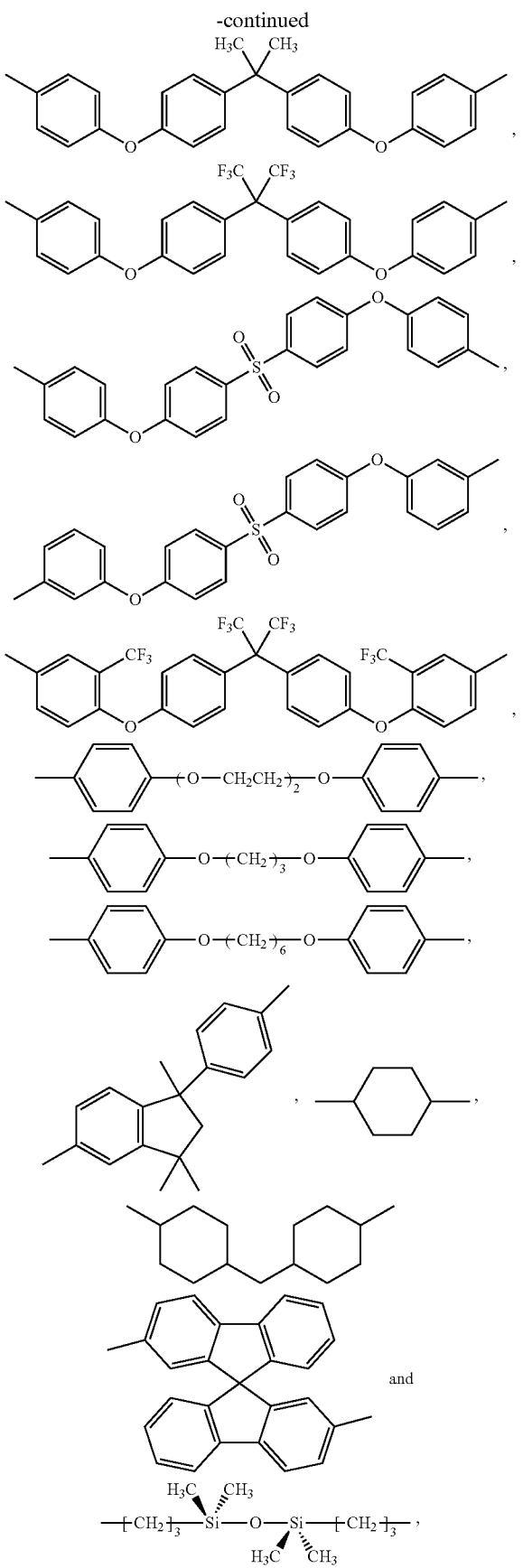

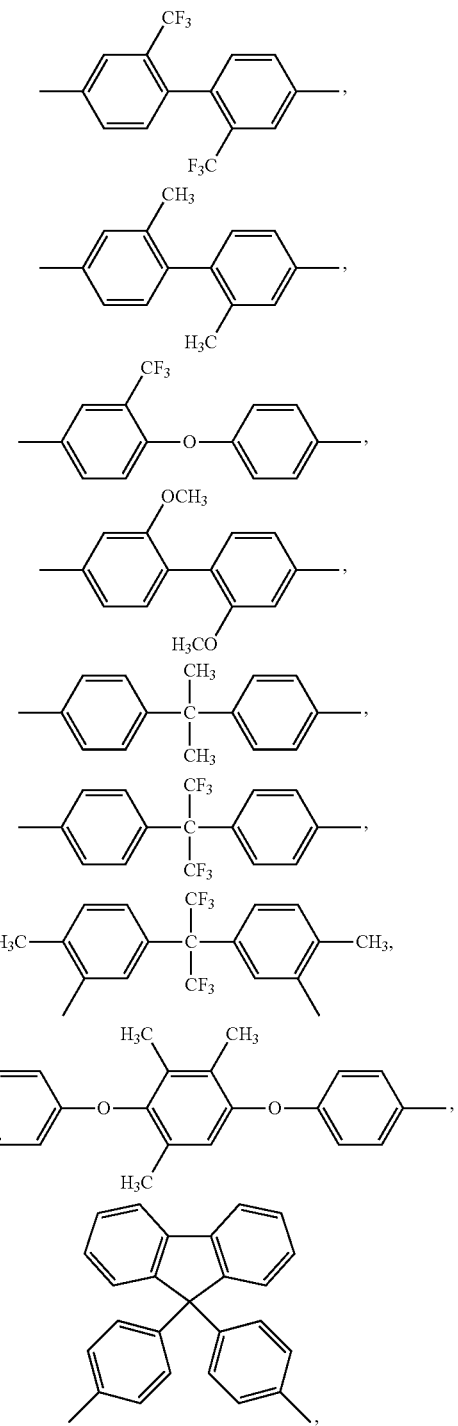

where:

each a is independently an integer of 0 to 4; and each Z is independently hydrogen, methyl, trifluoromethyl or halogen.

To allow the PI to have a preferred solubility and be resistant to yellowing after being solidified, according to a specific embodiment of the present invention, B is respectively a divalent organic group selected from the group consisting of the following groups:

-continued

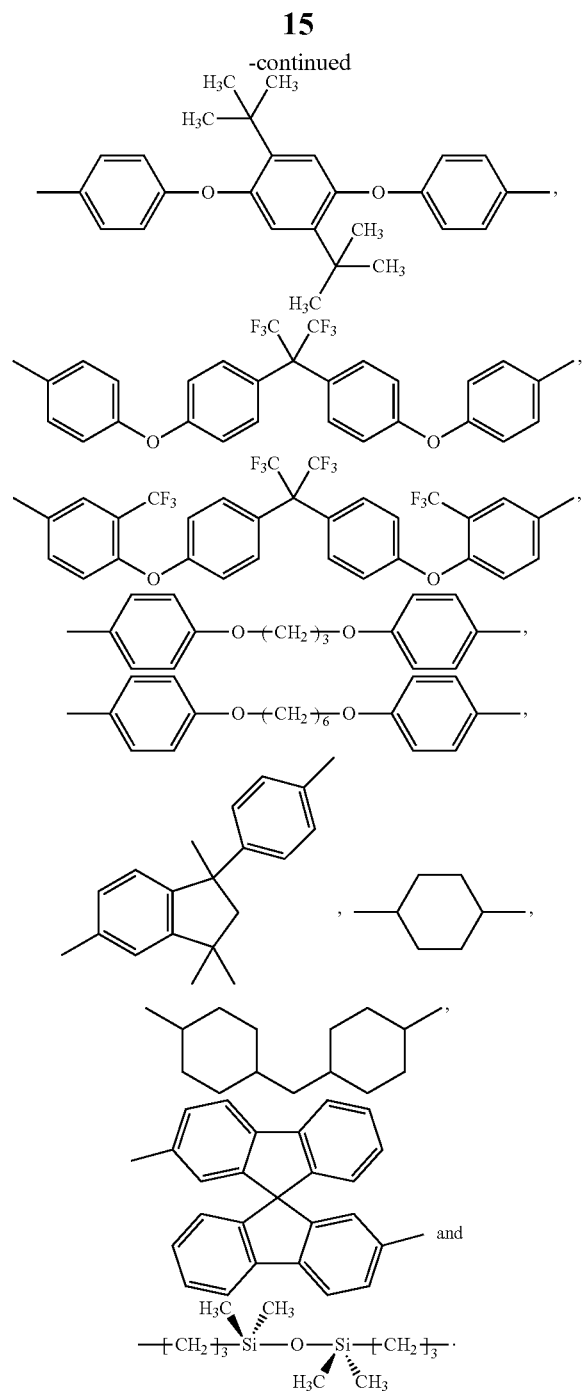

and

In Formula (I), n is an integer of 1 to 100, and preferably, an integer of 10 to 50.

The PI of the present invention may be obtained by any conventional preparation methods known to persons of ordinary skill in the art. For example, the PI may be prepared by a method including the following steps:

(a) reacting a dianhydride monomer represented by Formula (1) below in an excess amount with a diamine monomer represented by Formula (2) in a solvent to form a compound represented by Formula (3-1) below; or reacting a diamine monomer represented by Formula (2) in an excess amount with a dianhydride monomer represented by Formula (1) below to form a compound represented by Formula (3-2) below:

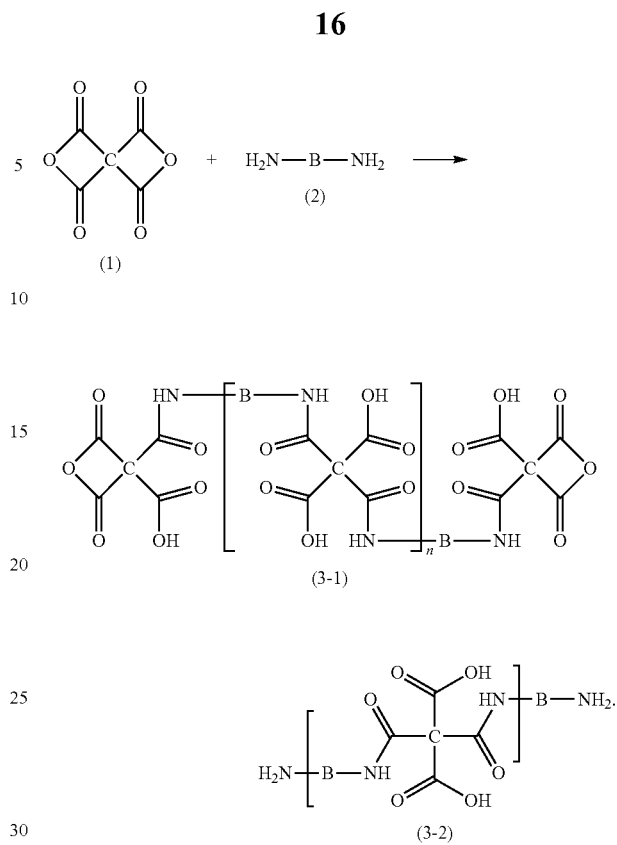

(b) next, subjecting the compound represented by Formula (3-1) to ring closure through heating dehydration or chemical cyclization, to form a compound represented by Formula (4) below:

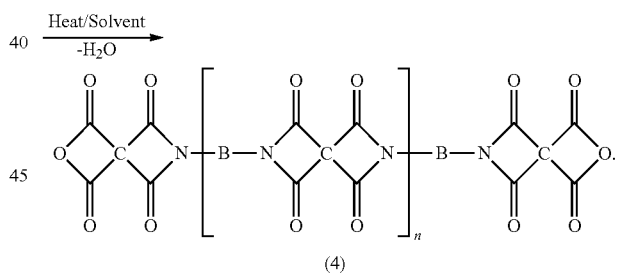

(c) or, adding another dianhydride monomer represented by Formula (5) or (6) below to the compound represented by Formula (3-2) above, and subjecting the mixture to ring closure through heating dehydration or chemical cyclization, to form a compound represented by Formula (7) below:

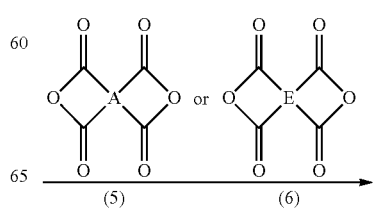

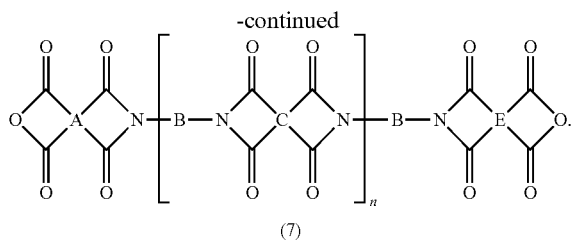

(7)

(d) next, subjecting the compound represented by Formula (4) or (7) to ring opening, to form a compound represented by Formula (8) or (9) below:

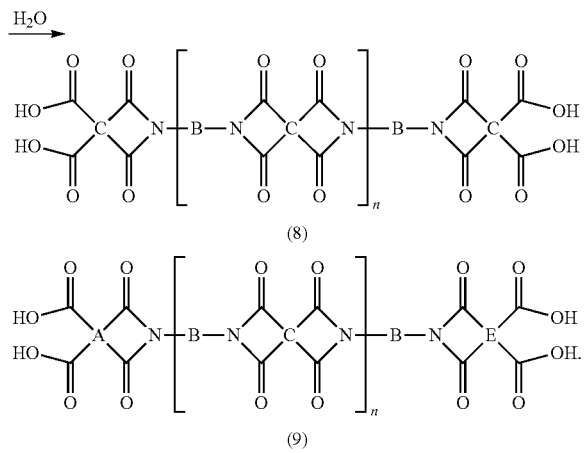

In the above step, a ratio between the total moles of the dianhydride monomer and the diamine monomer is 1:0.99 to 1:0.66, and A, B, C, E, and n are as defined above.

Dianhydrides suitable for use in the above preparation method generally may be an aliphatic dianhydride or aromatic dianhydride. If a dianhydride having good chemical resistance is demanded, it is preferred to use an aromatic dianhydride. Examples of the aromatic dianhydride include (but are not limited to) pyromellitic dianhydride (PMDA), 3,3',4,4'-biphenyltetracarboxylic dianhydride (S-BPDA), 4,4'-diphthalic dianhydride, 4,4'-hexafluoroisopropylidene-2,2-bis-(phthalic acid anhydride) (6FDA), 1-(trifluoromethyl)-2,3,5,6-benzenetetracarboxylic dianhydride (P3FDA), benzophenone-tetracarboxylic dianhydride (BTDA), 3,3',4,4'-diphenyl ether tetracarboxylic dianhydride (ODPA), 1,4-bis-(trifluoromethyl)-2,3,5,6-benzenetetracarboxylic dianhydride (P6FDA), 1-(3',4'-dicarboxyl phenyl)-1,3,3-trimethyl indane-5,6-dicarboxylic dianhydride, 1-(3',4'-dicarboxyl phenyl)-1,3,3-trimethyl indane-6,7-dicarboxylic dianhydride, 1-(3',4'-dicarboxyl phenyl)-3-methyl indane-5,6-dicarboxylic dianhydride, 1-(3',4'-dicarboxyl phenyl)-3-methyl indane-6,7-dicarboxylic dianhydride, 2,3,9,10-perylenetetracarboxylic dianhydride, 1,4,5,8-naphthalenetetracarboxylic dianhydride, 2,6-dichloronaphtalene-1,4,5,8-tetracarboxylic dianhydride, 2,7-dichloronaphtalene-1,4,5,8-tetracarboxylic dianhydride, 2,3,6,7-tetrachloronaphthalene-2,4,5,8-tetracarboxylic dianhydride, phenanthrene-1,8,9,10-tetracarboxylic dianhydride, 3,3',4,4'-benzophenonetetracarboxylic dianhydride, 1,2',3,3'-benzophenonetetracarboxylic dianhydride, 3,3',4,4'-benzophenonetetracarboxylic dianhydride, 2,2',3,3'-biphenyl tetracarboxylic dianhydride, 4,4'-isopropylidene diphthalic dianhydride, 3,3'-isopropylidene diphthalic dianhydride, 4,4'-oxydiphthalic dianhydride, 4,4'-sulfonyl diphthalic dianhydride, 3,3'-oxydiphthalic dianhydride, 4,4'-methylene diphthalic dianhydride, 4,4'-sulfenyl diphthalic dianhydride, 4,4'-ethylidene diphthalic dianhydride, 2,3,6,7-naphthalenetetracarboxylic dianhydride, 1,2,4,5-naphthalenetetracarboxylic dianhydride, 1,2,5,6-naphthalenetetracarboxylic dianhydride, benzene-1,2,3,4-tetracarboxylic dianhydride, pyridine-2,3,5,6-tetracarboxylic dianhydride, 1,2,3,4-cyclobutanetetracarboxylic dianhydride (CBDA), 5,5'-(9H-fluorene-9,9-diyl)diisobenzofuran-1,3-dione (BPAF), or a combination thereof.

Preferably, an aromatic dianhydride selected from the following group is used: PMDA, S-BPDA, 4,4'-diphthalic dianhydride, 6FDA, P3FDA, P6FDA, BTDA, ODPA, CBDA, BPAF, and a mixture thereof.

Diamines suitable for the aforementioned preparation method are not particularly limited, and an aromatic diamine is generally used. An aromatic diamine useful in the method of the present invention is well known to those skilled in the art. The aromatic diamine may be, for example, (but not limited to) selected from the following groups: 4,4'-oxydianiline (ODA), p-phenylenediamine (pPDA), m-dimethyl p-diamino biphenyl (DMDB), 2,2'-bis(trifluoromethyl)benzidine (TFMB), o-Tolidine (oTLD), 4,4'-octafluorobenzidine (OFB), trafluoro-p-phenylene diamine (TFPD), 2,2'-5,5'-tetrachlorobenzidine (TCB), 3,3'-dichlorobenzidine (DCB), 2,2'-bis(3-aminophenyl)hexafluoropropane, 2,2'-bis-(4-aminophenyl)hexafluoropropane, 4,4'-oxy-bis[3-(trifluoromethyl)aniline, 3,5-diaminobenzotrifluoride, tetrafluoro-1,4-phenylene diamine, tetrafluoro-m-phenylene diamine, 1,4-bis(4-aminophenoxy)-2-tert-butylbenzene (BATB), 2,2'-dimenthyl-4,4'-bis-(4-aminophenoxy)biphenyl (DBAPB), 4,4'-diaminodicyclohexylmethane (MDCA), 2,2-bis[4-(4-aminophenoxy)phenyl]hexafluoropropane (BAPPH), 2,2'-bis[4-(4-amino phenoxy)phenyl]norbornane (BAPN), 5-amino-1-(4'-aminophenyl)-1,3,3-trimethyl indane, 6-amino-1-(4'-aminophenyl)-1,3,3-trimethyl indane, 4,4'-methylene-bis(o-chloroaniline), 3,3'-dichlorodiphenylamine, 3,3'-sulfonyl diphenylamine, 4,4'-diaminobenzophenone, 1,5-diaminonaphthalene, bis(4-aminophenyl)diethyl silane, bis(4-aminophenyl)diphenyl silane, bis(4-aminophenyl)ethyl phosphine oxide, N-(bis(4-aminophenyl))-N-methylamine, N-(bis(4-aminophenyl))-N-phenylamine, 4,4'-methylene-bis(2-methylaniline), 4,4'-methylene-bis(2-anisidine), 5,5'-methylene-bis(2-aminophenol), 4,4'-methylene-bis(2-methylaniline), 4,4'-oxybis(2-anisidine), 4,4'-oxybis(2-chloroaniline), 2,2'-bis(4-aminophenol), 5,5'-oxybis(2-aminophenol), 4,4'-sulfenyl-bis(2-methylaniline), 4,4'-sulfenyl-bis(2-anisidine), 4,4'-sulfenyl-bis(2-chloroaniline), 4,4'-sulfonyl-bis(2-methylaniline), 4,4'-sulfonyl-bis(2-ethoxyaniline), 4,4'-sulfonyl-bis(2-chloroaniline), 5,5'-sulfonyl-bis(2-aminophenol), 3,3'-dimenthyl-4,4'-diaminobenzophenone, 3,3'-dimethoxy-4,4'-diaminobenzophenone, 3,3'-dichloro-4,4'-diaminobenzophenone, 4,4'-diaminodiphenyl, m-phenylenediamine, 4,4'-methylenediphenylamine (MDA), 4,4'-sulfenyl diphenylamine, 4,4'-sulfonyl diphenylamine, 4,4'-isopropylidene diphenylamine, 3,3'-dimethoxybenzidine, 3,3'-dicarboxylicbenzidine, 2,4-toluene diamine, 2,5-toluene diamine, 2,6-toluene diamine, m-xylyl diamine, 2,4-diamino-5-chlorotoluene, 2,4-diamino-6-chlorotoluene, 1,4-diaminocyclohexane (CHDA), 4-(9-(4-aminophenyl)-9H-fluoren-9-yl)benzenamine (BAFL), 9-(4-aminophenyl)-9-phenyl-9H-fluoren-3-amine, 1-(4-aminophenyl)-2,3-dihydro-1,3,3-trimethyl-1H-inden-5-amine (TMDA), and a combination thereof.

Preferably, ODA, pPDA, DMDB, TFMB, oTLD, MDA, MDCA, CHDA, BAFL, 9-(4-aminophenyl)-9-phenyl-9H-fluoren-3-amine, TMDA, or a mixture thereof is used.

Preferably, a diamine selected from the following group is used:

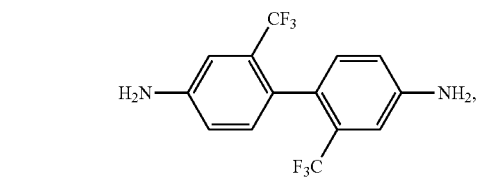
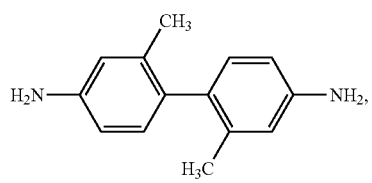
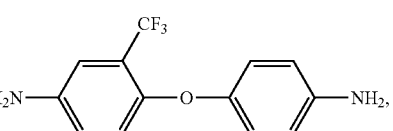
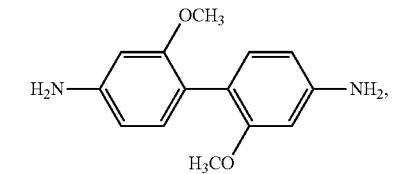
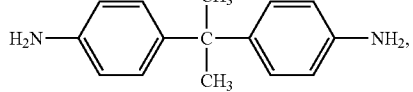
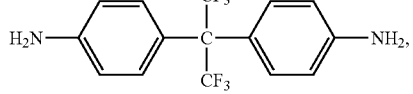
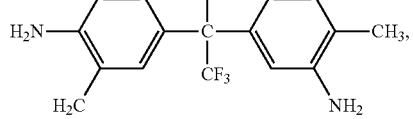
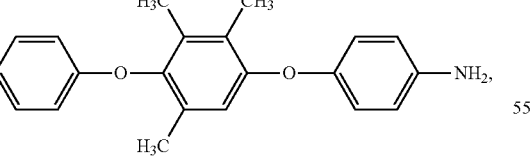
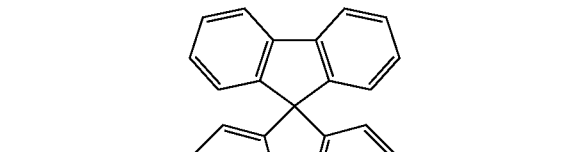
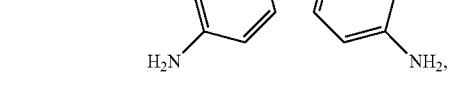

-continued

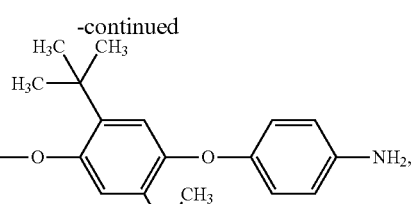
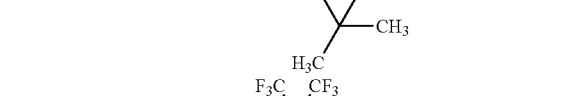
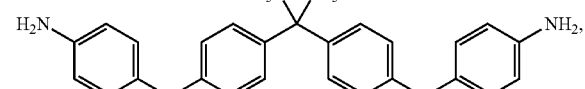
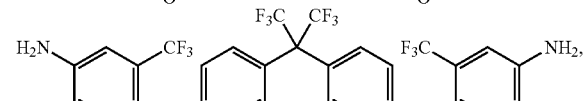
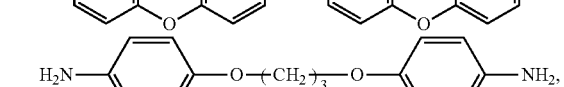
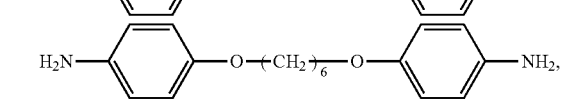
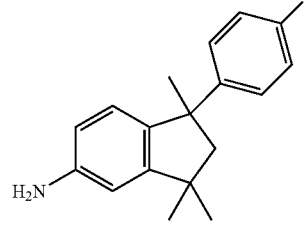
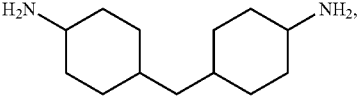
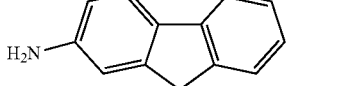
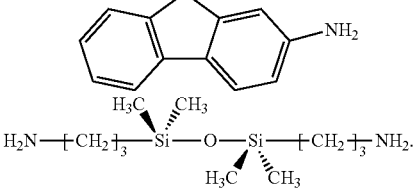

and

A solvent suitable for the preparation method is not particularly limited, and includes, but is not limited to, a non-protonic solvent, an ester, an ether alcohol, or an ether ester. For example, the non-protonic solvent may be selected from the group consisting of alkyl pyrrolidone such as N-methyl pyrrolidone (NMP) and N-ethyl pyrrolidone (NEP); dimethyl acetamide (DMAC); dimethyl formamide (DMF); dimethyl sulfoxide (DMSO); toluene; xylene; and a mixture thereof. An ester solvent useful in the present invention includes, but is not limited to, isobutyl acetate (IBAC), ethyl acetate (EAC), butyl acetate (BAC), ethyl formate, methyl acetate, ethoxyethyl acetate, ethoxypropyl acetate, ethyl isobutyrate, monomethyl ether propylene glycol acetate, amyl acetate, Gamma-butyrolactone (GBL), or a mixture thereof. An ether alcohol solvent useful in the present invention includes, but is not limited to, butyl glycol (BCS), ethylene glycol ethyl ether acetate (CAC), ethylene glycol monomethyl ether (ECS), propylene glycol monomethyl ether (PGME), propylene glycol methyl ether acetate (PMA), propylene glycol monomethyl ether propionate (PMP), butylene glycol ether (DBE), or a mixture thereof.

It is known that the cyclization temperature required for preparing PI is generally higher than 350° C. However, the present invention provides SPI which has undergone ring closure in a solvent in advance and has a lower thermosetting temperature. Hence, the SPI of the invention can be solidified at a temperature as low as 270° C. Consequently, operating cost is reduced. The PI of the present invention has a lower thermosetting temperature and excellent thermal stability such as excellent ageing resistance and excellent pyrolysis resistance.

The present invention also relates to a coating composition, which contains the aforementioned PI represented by Formula (I) and a hardening agent having 2 to 6 functional groups capable of reacting with —COOH. After the PI represented by Formula (I) in the coating composition of the present invention reacts with the hardening agent having 2 to 6 functional groups capable of reacting with —COOH, net-like cross-linking occurs. Therefore, a coating layer and film formed by the coating composition of the present invention possess excellent chemical resistance and thermal properties.

In the coating composition of the present invention, based on the total weight of the composition, the content of the PI represented by Formula (I) is at least 1 wt %, and preferably, from 2 wt % to 20 wt %.

The functional group capable of reacting with —COOH is selected from the group consisting of an epoxy group, an isocyanate group (NCO), □an oxazolyl group, a benzoxazinyl group,

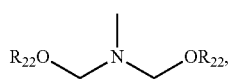

and a mixture thereof. Each $R_{22}$ may be the same or different, and is independently —H or a $C_1$-$C_6$ alkyl group. The selection of the functional group of the hardening agent generally depends on the coating composition to be obtained, for example, requirements of properties such as chemical resistance, low CTE, yellowing resistance, and good flexibility. According to a specific embodiment of the present invention, the functional group capable of reacting with —COOH is an epoxy group, an oxazolyl group, or

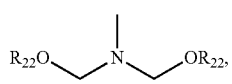

where $R_{22}$ is as described above.

Examples of the hardening agent useful in the present invention may be selected from 2,2'-[9H-fluoren-9-ylidenebis(4,1-phenyleneoxymethylene)]bis-oxirane, 2,2'-(4,4'-(propane-2,2-diyl)bis(4,1-phenylene))bis(oxy)bis(methylene)bis-oxirane, 1,3-diisocyanatobenzene, toluenediisocyanate, cyclohexanediisocyanate, trimethylcyclohexanediisocyanate, cyclohexanebis(methylisocyanate), isophoronediisocyanate, xylenediisocyanate, diphenyl methane diisocyanate, (1,3-bis(4,5-dihydrooxazol-2-yl)benzene), hexa(methylformaldehyde)melamine resin, hexa(ethylanilineformaldehyde)melamine resin, tetra(methylformaldehyde)diaminomelamine resin, tetra(methylformaldehyde)bi(butylformaldehyde)melamine resin, tetra(methylformaldehyde)bi(propylformaldehyde)melamine resin, 2,4,6-tri[bis(methoxymethyl)amino]-1,3,5-triazine, N2,N2,N4,N4,N6,N6-hexa(methoxymethyl)-1,3,5-triazine-2,4,6-triamine), or a combination thereof.

According to the present invention, the content of the hardening agent is about 0.01 wt % to 50 wt %, and preferably, about 0.1 wt % to 10 wt %, based on the total weight of solid content of the coating composition.

The coating composition of the present invention may further contain a solvent. The solvent useful in the present invention is not particularly limited, and may include a polar non-protonic solvent, an ester, an ether alcohol, an ether ester, or a mixture thereof. According to a specific embodiment of the present invention, the solvent is an ether alcohol or an ether ester. Examples of the solvent are solvents described in the aforementioned preparation method. The content of the solvent is in a range of 30 wt % to 99 wt %, preferably from 70 wt % to 95 wt %, based on the total weight of the composition.

The coating composition of the present invention may contain any additional component contained in conventional coating compositions. Such additional components may be, for example, (but are not limited to), an inorganic particulate, a UV light absorber, a leveling agent, a defoamer, a stabilizing agent, and a catalyst required for the reaction of a hardening agent.

The coating composition of the present invention has good storage stability and thermal stability. After the PI represented by Formula (I) reacts with the hardening agent in the coating composition of the present invention, cross-linking occurs. Consequently, a thin film formed by the coating composition of the present invention has excellent chemical resistance, a low CTE, and good flexibility, and does not crack easily. Therefore, the thin film can be used in thermosetting low-temperature hardening protective material for active/passive devices, optical materials, touch panels, copper foil substrates, soft flexible electronic materials, or integrated circuit elements. The thin film formed by the coating composition of the present invention has the characteristics of high transparency and resistance to yellowing. It is applicable to the manufacturing process for a thin glass film touch panel (G/F), whereby a glass base material can be replaced with a PI thin film substrate.

The present invention further provides a flexible device, which includes a thin film formed by the coating composition described above. The flexible device may be a touch panel, an active/passive device, an optical material, a copper foil substrate, a soft flexible electronic material, or an integrated circuit element.

The following examples are provided to further illustrate the present invention, but not intended to limit the scope of the present invention. Modifications and variations achievable by a person of ordinary skill in the art without departing from the spirit of the present invention shall fall within the scope of the present invention.

EXAMPLES

In the following examples, abbreviations used are defined as follows:

6FDA: 4,4'-hexafluoroisopropylidene-2,2-bis-(phthalic acid anhydride)
S-BPDA: 3,3',4,4'-Biphenyltetracarboxylic dianhydride
CBDA: 1,2,3,4-cyclobutanetetracarboxylic dianhydride
BPAF: 5,5'-(9H-fluorene-9,9-diyl)diisobenzofuran-1,3-dione
TFMB: 2,2'-bis(trifluoromethyl)benzidine
CHDA: 1,4-diaminocyclohexane
BAFL: 4-(9-(4-aminophenyl)-9H-fluoren-9-yl)benzenamine
TMDA: 1-(4-aminophenyl)-2,3-dihydro-1,3,3-trimethyl-1H-inden-5-amine
MA: maleic anhydride
PETA: phenylethynyl trimellitic anhydride
FEP: 2,2'-[9H-fluoren-9-ylidenebis(4,1-phenyleneoxymethylene)]bis-oxirane
BPO: 1,3-bis(4,5-dihydrooxazol-2-yl)benzene
MM1: N2,N2,N4,N4,N6,N6-hexa(methoxymethyl)-1,3,5-triazine-2,4,6-triamine
DMAc: dimethyl acetamide
NMP: N-methylpyrrolidone SPI Synthesis Examples Example A-1

Synthesis of a PI (PI-A1) Having a Tetracid End Group 97.7328 g (0.22 mol) 6FDA and 64.046 g (0.2 mol) TFMB were weighed and added to 640 mL NMP to form a solution, and the solution was stirred for 1 hour at room temperature, and then heated to a temperature of 60° C. and stirred for 4 hours. After 4 hours of stirring, 320 mL xylene was added to the solution, and the solution was dehydrated at a temperature of 180° C. by using a Dean-Stark apparatus. After dehydration was completed, the solution was cooled to room temperature, and 0.7208 g (0.04 mol) $H_2O$ was added. After that, the solution was heated to a temperature of 80° C., and stirred for 4 hours, to obtain PI-A1.

Example A-2

Synthesis of a PI (PI-A2) Having a Tetracid End Group 43.1442 g (0.22 mol) CBDA and 64.046 g (0.2 mol) TFMB were weighed and added to 640 mL NMP to form a solution, and the solution was stirred for 1 hour at room temperature, and then heated to a temperature of 60° C., and stirred for 4 hours. After 4 hours of stirring, 320 mL xylene was added to the solution, and the solution was dehydrated at a temperature of 180° C. by using a Dean-Stark apparatus. After dehydration was completed, the solution was cooled to room temperature, and 0.7208 g (0.04 mol) $H_2O$ was added. After that, the solution was heated to a temperature of 80° C., and stirred for 4 hours, to obtain PI-A2.

Example A-3

Synthesis of a PI (PI-A3) Having a Tetracid End Group 48.8664 g (0.11 mol) 6FDA and 64.046 g (0.2 mol) TFMB were weighed and added to 640 mL NMP to form a solution, and the solution was stirred for 1 hour at room temperature, and then heated to a temperature of 60° C., and stirred for 4 hours. 32.3642 g (0.11 mol) S-BPDA was then added to the solution and the solution was stirred for 4 hours. After that, 320 mL xylene was added to the solution, and the solution was dehydrated at a temperature of 180° C. by using a Dean-Stark apparatus. After dehydration was completed, the solution was cooled to room temperature, and 0.7208 g (0.04 mol) $H_2O$ was added. After that, the solution was heated to a temperature of 80° C., and stirred for 4 hours, to obtain PI-A3.

Example A-4

Synthesis of a PI (PI-A4) Having a Tetracid End Group 97.7328 g (0.22 mol) 6FDA and 22.8378 g (0.2 mol) CHDA were weighed and added to 640 mL NMP to form a solution, and the solution was stirred for 1 hour at room temperature, and then heated to a temperature of 70° C., and stirred for 4 hours. After 4 hours of stirring, 320 mL xylene was added to the solution, and the solution was dehydrated at a temperature of 180° C. by using a Dean-Stark apparatus. After dehydration was completed, the solution was cooled to room temperature, and 0.7208 g (0.04 mol) $H_2O$ was added. After that, the solution was heated to a temperature of 80° C., and stirred for 4 hours, to obtain PI-A4.

Example A-5

Synthesis of a PI (PI-A5) Having a Tetracid End Group 50.4260 g (0.11 mol) BPAF and 64.046 g (0.2 mol) TFMB were weighed and added to 640 mL NMP to form a solution, and the solution was stirred for 1 hour at room temperature, and then heated to a temperature of 60° C., and stirred for 4 hours. 32.3642 g (0.11 mol) S-BPDA was then added to the solution and the solution was stirred for 4 hours. After that, 320 mL xylene was added to the solution, and the solution was dehydrated at a temperature of 180° C. by using a Dean-Stark apparatus. After dehydration was completed, the solution was cooled to room temperature, and 0.7208 g (0.04 mol) $H_2O$ was added to the solution. After that, the solution was heated to a temperature of 80° C., and stirred for 4 hours, to obtain PI-A5.

Example A-6

Synthesis of a PI (PI-A6) Having a Tetracid End Group 48.8664 g (0.11 mol) 6FDA, 32.026 g (0.1 mol) TFMB, and 34.8440 g (0.1 mol) BAFL were weighed and added to 640 mL NMP to form a solution, and the solution was stirred for 1 hour at room temperature, and then heated to a temperature of 60° C., and stirred for 4 hours. 32.3642 g (0.11 mol) S-BPDA was then added to the solution, and the solution was stirred for 4 hours. After that, 320 mL xylene was added to the solution, and the solution was dehydrated at a temperature of 180° C. by using a Dean-Stark apparatus. After dehydration was completed, the solution was cooled to room temperature, and 0.7208 g (0.04 mol) $H_2O$ was added to the solution. After that, the solution was heated to a temperature of 80° C., and stirred for 4 hours, to obtain PI-A6.

Example A-7

Synthesis of a PI (PI-A7) Having a Tetracid End Group 97.7328 g (0.22 mol) 6FDA, 32.026 g (0.1 mol) TFMB, and 26.6381 g (0.1 mol) TMDA were weighed and added to 640 mL NMP to form a solution, and the solution was stirred for 1 hour at room temperature, and then heated to a temperature of 60° C., and stirred for 4 hours. 320 mL xylene was then added to the solution, and the solution was dehydrated at a temperature of 180° C. by using a Dean-Stark apparatus. After dehydration was completed, the solution was cooled to room temperature, and 0.7208 g (0.04 mol) $H_2O$ was added to the solution. After that, the solution was heated to a temperature of 80° C., and stirred for 4 hours, to obtain PI-A7.

Comparative Example A-8

Synthesis of a PI (PI-M1) Having an MA End Group 88.848 g (0.2 mol) 6FDA and 70.4506 g (0.22 mol) TFMB were weighed and added to 640 mL NMP to form a solution, and the solution was stirred for 1 hour at room temperature, and then heated to a temperature of 60° C., and stirred for 4 hours. After 4 hours of stirring, 320 mL xylene was added to the solution, and the solution was dehydrated at a temperature of 180° C. by using a Dean-Stark apparatus. After dehydration was completed, the solution was cooled to room temperature, and 3.9224 g (0.04 mol) MA was added to the solution. After that, the solution was heated to a temperature of 80° C., and stirred for 8 hours, to obtain PI-M1.

Comparative Example A-9

Synthesis of a PI (PI-M2) Having an MA End Group 88.848 g (0.2 mol) 6FDA and 25.1216 g (0.22 mol) CHDA were weighed and added to 640 mL NMP to form a solution, and the solution was stirred for 1 hour at room temperature, and then heated to a temperature of 70° C., and stirred for 4 hours. After 4 hours of stirring, 320 mL xylene was added to the solution, and the solution was dehydrated at a temperature of 180° C. by using a Dean-Stark apparatus. After dehydration was completed, the solution was cooled to room temperature and 3.9224 g (0.04 mol) MA was added to the solution. After that, the solution was heated to a temperature of 80° C., and stirred for 8 hours, to obtain PI-M2.

Comparative Example A-10

Synthesis of a PI (PI-P1) Having a PETA End Group 88.848 g (0.2 mol) 6FDA and 70.4506 g (0.22 mol) TFMB were weighed and added to 640 mL NMP to form a solution, and the solution was stirred for 1 hour at room temperature, and then heated to a temperature of 60° C., and stirred for 4 hours. After 4 hours of stirring, 320 mL xylene was added to the solution, and the solution was dehydrated at a temperature of 180° C. by using a Dean-Stark apparatus. After dehydration was completed, the solution was cooled to room temperature, and 11.0496 g (0.04 mol) PETA was added to the solution. After that, the solution was heated to a temperature of 80° C., and stirred for 8 hours, to obtain PI-P1.

Comparative Example A-11

Synthesis of a PI (PI-P2) Having a PETA End Group 88.848 g (0.2 mol) 6FDA and 25.1216 g (0.22 mol) CHDA were weighed and added to 640 mL NMP to form a solution, and the solution was stirred for 1 hour at room temperature, and then heated to a temperature of 50° C., and stirred for 4 hours. After 4 hours of stirring, 320 mL xylene was added to the solution, and the solution was dehydrated at a temperature of 180° C. by using a Dean-Stark apparatus. After dehydration was completed, the solution was cooled to room temperature, and 11.0496 g (0.04 mol) PETA was added to the solution. After that, the solution was heated to a temperature of 80° C., and stirred for 8 hours, to obtain PI-P2.

Coating Examples

Example R-1

100 g PI-A1 and 0.4 g FEP were mixed and stirred homogeneously to obtain a formulation RP-1.

Example R-2

100 g PI-A1 and 0.6 g BPO were mixed and stirred homogeneously to obtain a formulation RP-2.

Example R-3

100 g PI-A1 and 0.2 g MM1 were mixed and stirred homogeneously to obtain a formulation RP-3.

Example R-4

100 g PI-A2 and 0.4 g FEP were mixed and stirred homogeneously to obtain a formulation RP-4.

Example R-5

100 g PI-A4 and 0.4 g FEP were mixed and stirred homogeneously to obtain a formulation RP-5.

Example R-6

100 g PI-A4 and 0.6 g BPO were mixed and stirred homogeneously to obtain a formulation RP-6.

Example R-7

100 g PI-A4 and 0.2 g MM1 were mixed and stirred homogeneously to obtain a formulation RP-7.

Example R-8

100 g PI-A3 and 0.4 g FEP were mixed and stirred homogeneously to obtain a formulation RP-8.

Example R-9

100 g PI-A3 and 0.6 g BPO were mixed and stirred homogeneously to obtain a formulation RP-9.

Example R-10

100 g PI-A3 and 0.2 g MM1 were mixed and stirred v to obtain a formulation RP-10.

Example R-11

100 g PI-A5 and 0.4 g FEP were mixed and stirred homogeneously to obtain a formulation RP-11.

Example R-12

100 g PI-A6 and 0.4 g FEP were mixed and stirred homogeneously to obtain a formulation RP-12.

Example R-13

100 g PI-A7 and 0.4 g FEP were mixed and stirred homogeneously to obtain a formulation RP-13.

In the above Examples R-1 to R-13, the formulations were diluted to a solid content of 10% with propylene glycol monomethyl ether (PGME).

Physical Property Test:

Next, the formulations of Example R-1 to R-13 and the formulations of the comparative examples A-8 to A-11 were coated on silica glass, respectively. The formed films were soft-baked at a temperature of 80° C., and once the films were not sticky, they were hard-baked at a high temperature (250° C.) for 1 hour. The thickness of the film was fixed to 10 μm.

Coloration Test:

The films of the foregoing examples and comparative examples were baked again in air after being hard-baked, and a change of color before and after the baking was observed. The baking conditions were: baking at a temperature of 280° C. in air for 30 minutes. A film which did not experience color change was marked as "good," and a film which turned yellow was marked as "failed."

Brittle Test:

The hard-baked thin films were removed and folded in half at an angle of 180 degrees, and then checked to see if any fracture had occurred. A thin film without any fracture was marked as "good," and a thin film having a fracture was marked as "failed."

Thermal Property Test:

The CTE values of the thin films at a temperature from 20° C. to 200° C. were measured by using a thermal mechanical analyzer (TMA). A smaller CTE value indicates better thermal properties.

Chemical Resistance Test:

The hard-baked coating films of the foregoing examples and comparative examples were immersed in propylene glycol monomethyl ether acetate (PGMEA) for 4 minutes at a temperature of 25° C., and then checked to see if the surface of the coating film was abnormal. A film that produced white mist or dissolved was marked as "failed," and a film without any abnormality was marked as "good."

The test results were recorded in Table 1.

TABLE 1

| | Coloration | Brittle | CTE (ppm) | Chemical Resistance |
|---|---|---|---|---|
| Example R-1 | good | good | 32 | good |
| Example R-2 | good | good | 36 | good |
| Example R-3 | good | good | 30 | good |
| Example R-4 | good | good | 19 | good |
| Example R-5 | good | good | 36 | good |
| Example R-6 | good | good | 39 | good |
| Example R-7 | good | good | 33 | good |
| Example R-8 | good | good | 25 | good |
| Example R-9 | good | good | 28 | good |
| Example R-10 | good | good | 23 | good |
| Example R-11 | good | good | 22 | good |
| Example R-12 | good | good | 28 | good |
| Example R-13 | good | good | 37 | good |
| Comparative example A-8 | good | good | 46 | failed |
| Comparative example A-9 | good | good | 50 | failed |
| Comparative example A-10 | failed | failed | 31 | good |
| Comparative example A-11 | failed | failed | 34 | good |

The main problems exhibited in Comparative Examples A-8 and A-9 are poor chemical resistance and excessively high CTE values. Although the coatings of Comparative Examples A-10 and A-11 have good chemical resistance, yellowing occurs, and the produced thin film may be brittle, thereby compromising its reliability.

It can be known through comparison of Examples R-1 to R-3 and Comparative Examples A-8 and A-10 or through comparison of Examples R-5 to R-7 and Comparative Examples A-9 and A-11 that, when the same diamine and dianhydride are used, compared with a formulation using a double bond or a triple bond as an end group, the formulation using a tetracid group as an end group has the following advantages: 1) good yellowing resistance at high temperature, 2) good flexibility, 3) low CTE, and 4) good chemical resistance.

What is claimed is:

1. A coating composition comprising at least 1% of polyimide (PI), based on the total weight of the composition, and a hardening agent having 2 to 6 functional groups capable of reacting with —COOH, wherein the polyimide (PI) has a structure represented by Formula (I):

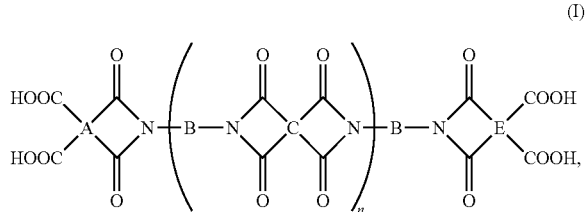

wherein:
A, C and E are the same or different and are each independently a tetravalent organic group, and if n is greater than 1, each C is the same or a different tetravalent organic group;
each B is the same or different, and is independently a divalent organic group; and
n is an integer greater than 0, and wherein the 2 to 6 functional groups of the hardening agent are selected from the group consisting of an oxazolyl group, a benzoxazinyl group, and a mixture thereof.

2. The coating composition according to claim 1, wherein A, C and E are respectively a tetravalent organic group selected from the group consisting of the following groups:

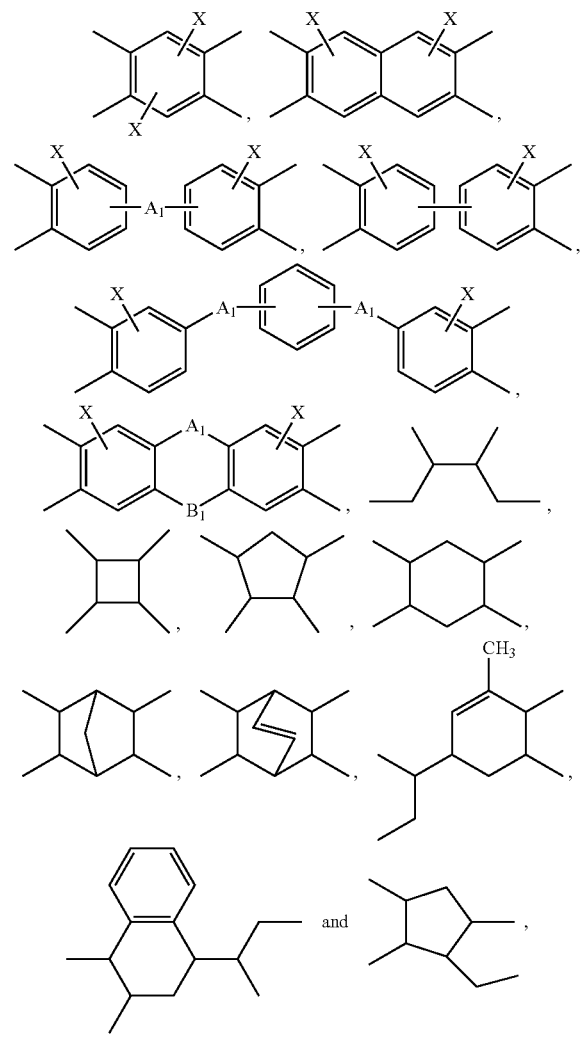

wherein:
  each X is independently hydrogen, halogen, a linear or branched $C_1$-$C_4$ perfluoroalkyl group, or a linear or branched $C_1$-$C_4$ alkyl group; and
  $A_1$ and $B_1$ are each independently a covalent bond, a linear or branched $C_1$-$C_4$ alkyl group, a linear or branched $C_1$-$C_4$ perfluoroalkyl group, an alkoxy group, silanyl, oxygen, sulfur, carbonyl, a carboxylate group, sulfonyl, phenyl, biphenyl, fluorenyl, or

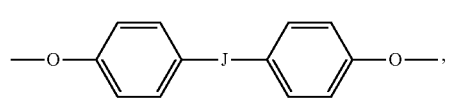

wherein J is —O—, —$SO_2$—, —$CH_2$—, —$C(CF_3)_2$, and —$C(CH_3)_2$.

3. The coating composition according to claim 2, wherein A, C and E are respectively a tetravalent organic group selected from the group consisting of the following groups:

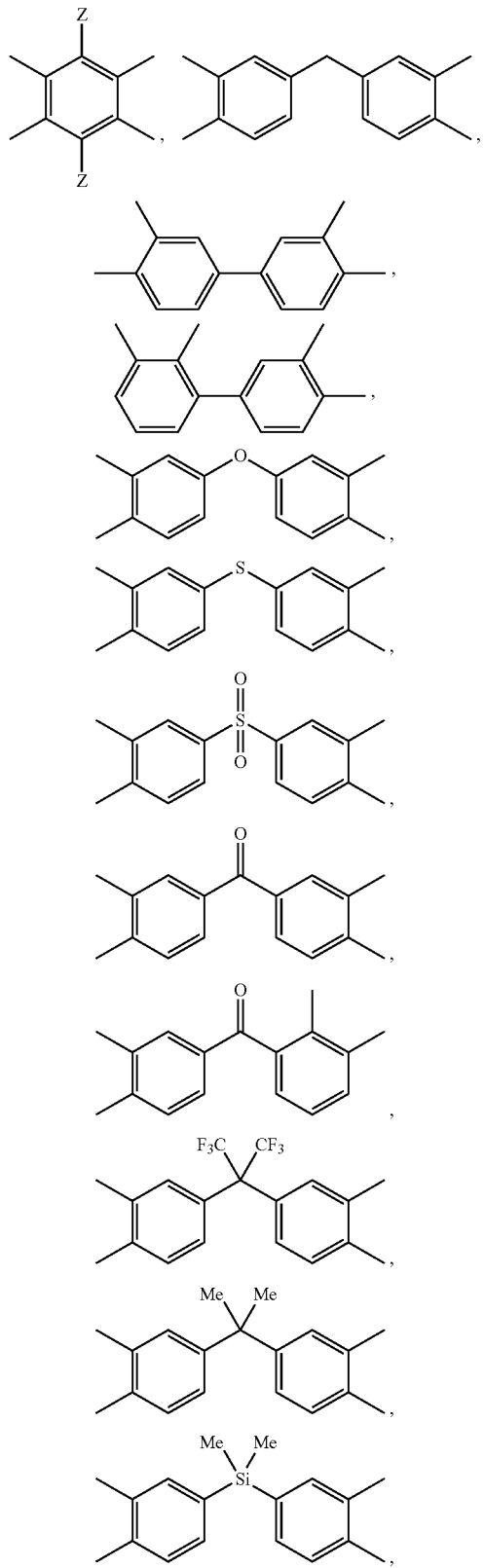

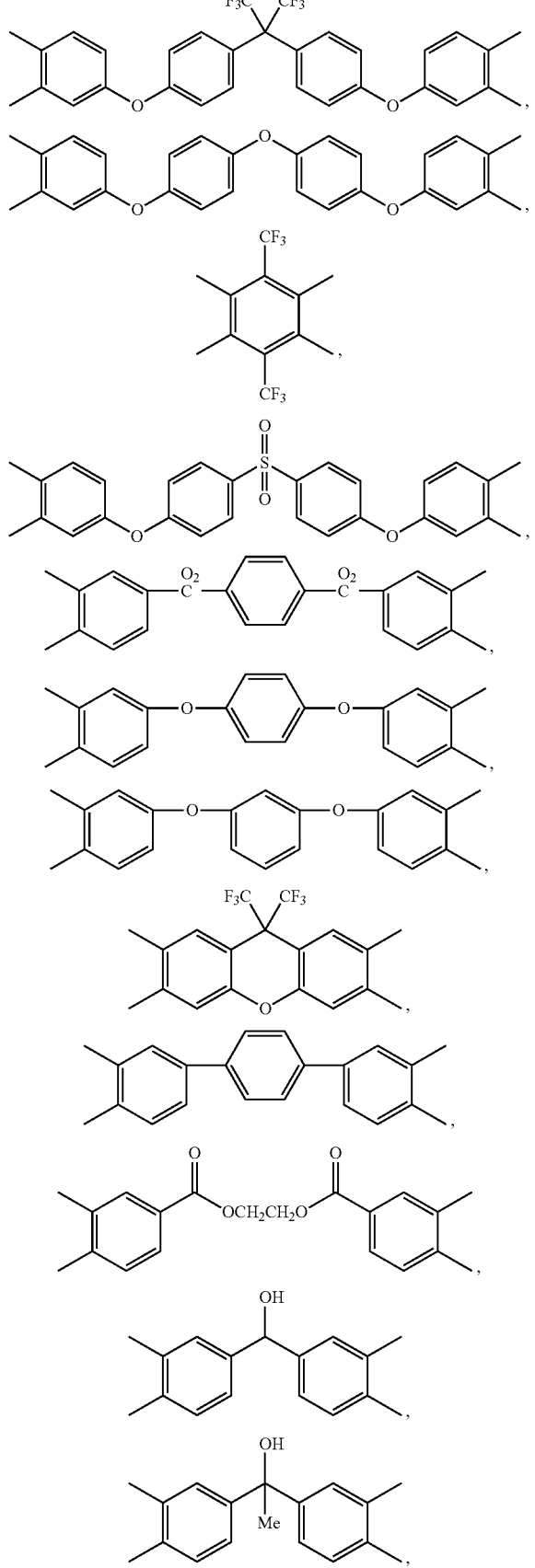
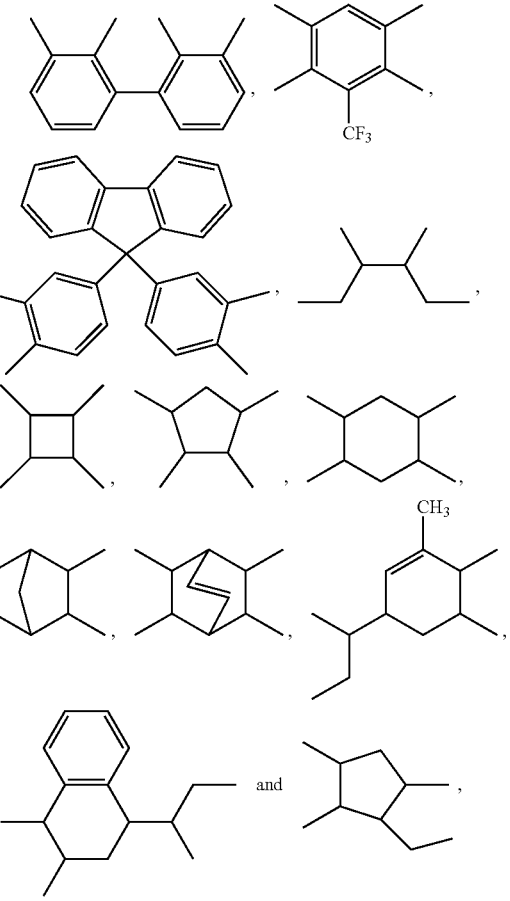
wherein Z is hydrogen or halogen.
4. The coating composition according to claim 3, wherein A, C and E are respectively a tetravalent organic group selected from the group consisting of the following groups:
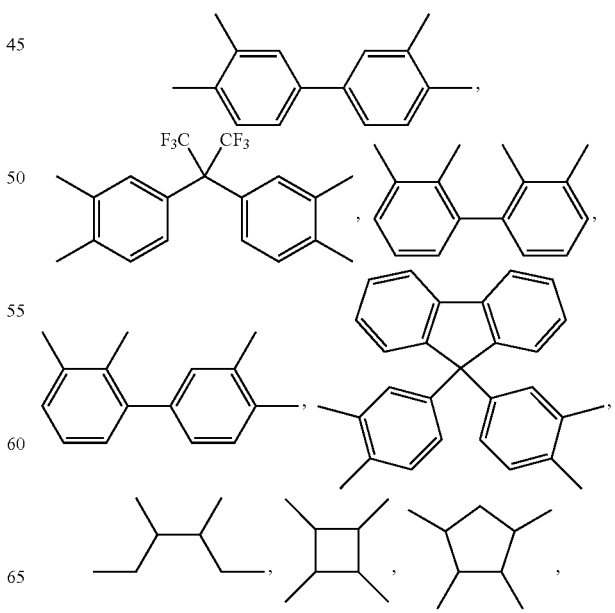

-continued

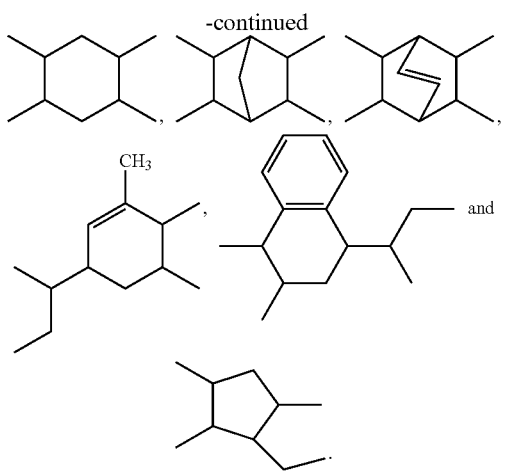

5. The coating composition according to claim 1, wherein B is respectively a divalent organic group selected from the group consisting of the following groups:

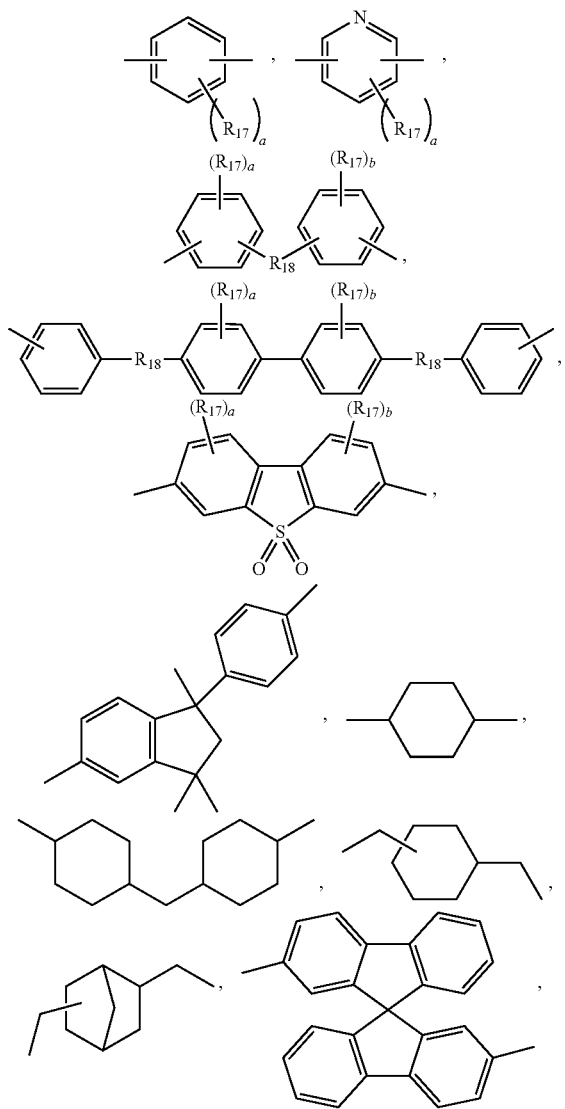

-continued

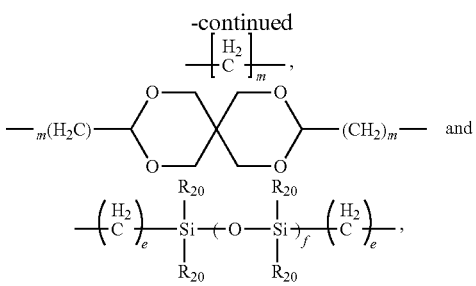

wherein:
each $R_{17}$ is independently H, a $C_1$-$C_4$ alkyl group, a $C_1$-$C_4$ perfluoroalkyl group, methoxy, ethoxyl, halogen, —OH, —COOH, —NH$_2$, or —SH;
each a is independently an integer of 0 to 4;
each b is independently an integer of 0 to 4; and
$R_{18}$ is a covalent bond or is selected from the following groups:

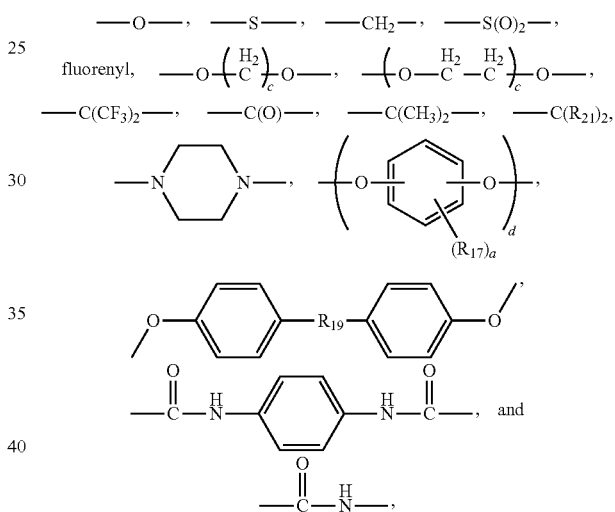

wherein:
c and d are each independently an integer of 0 to 20;
$R_{17}$ and a are as defined above;
$R_{19}$ is —S(O)$_2$—, —C(O)—, a covalent bond, or a linear or branched $C_1$-$C_{18}$ alkyl group;
each $R_{20}$ is independently H, methyl, ethyl, or phenyl;
each $R_{21}$ is independently a $C_1$-$C_{20}$ alkyl group or a cyclic alkyl group;
each m is independently an integer of 1 to 20; and
e and f are each independently an integer greater than 0.

6. The coating composition according to claim 5, wherein B is respectively a divalent organic group selected from the group consisting of the following groups:

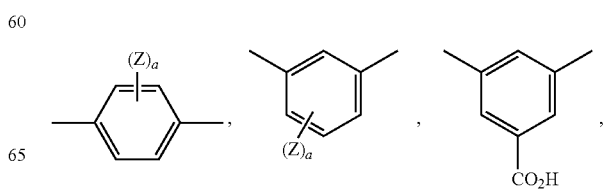

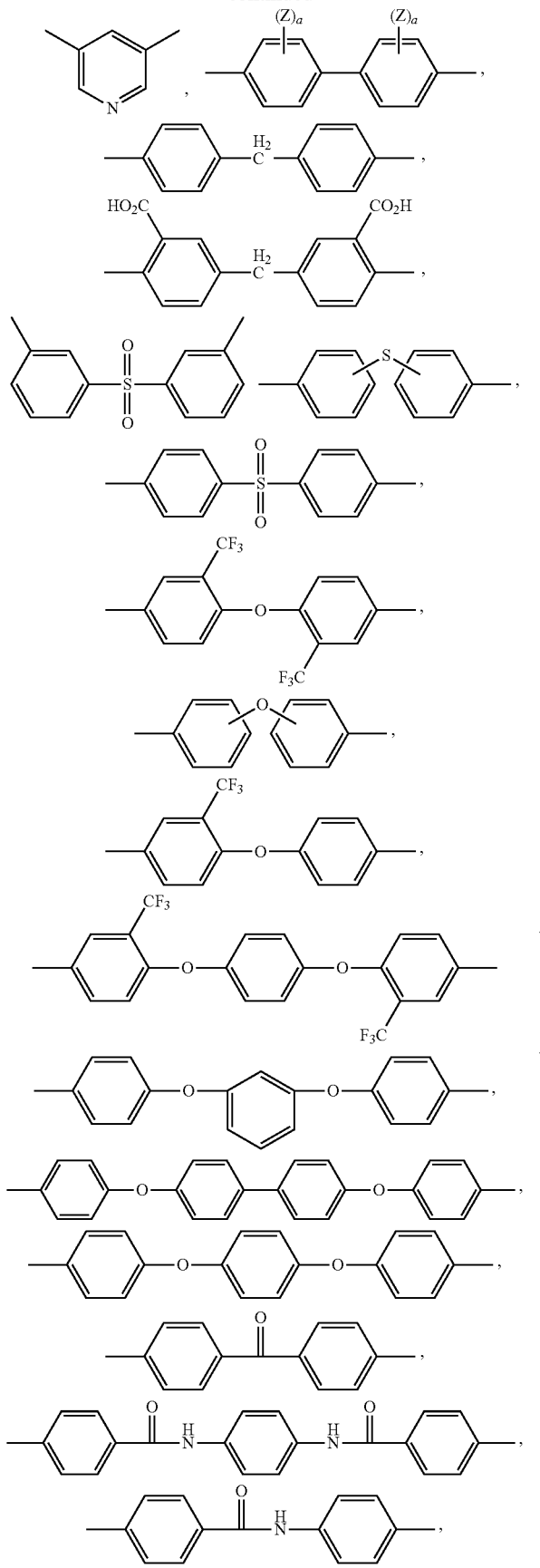
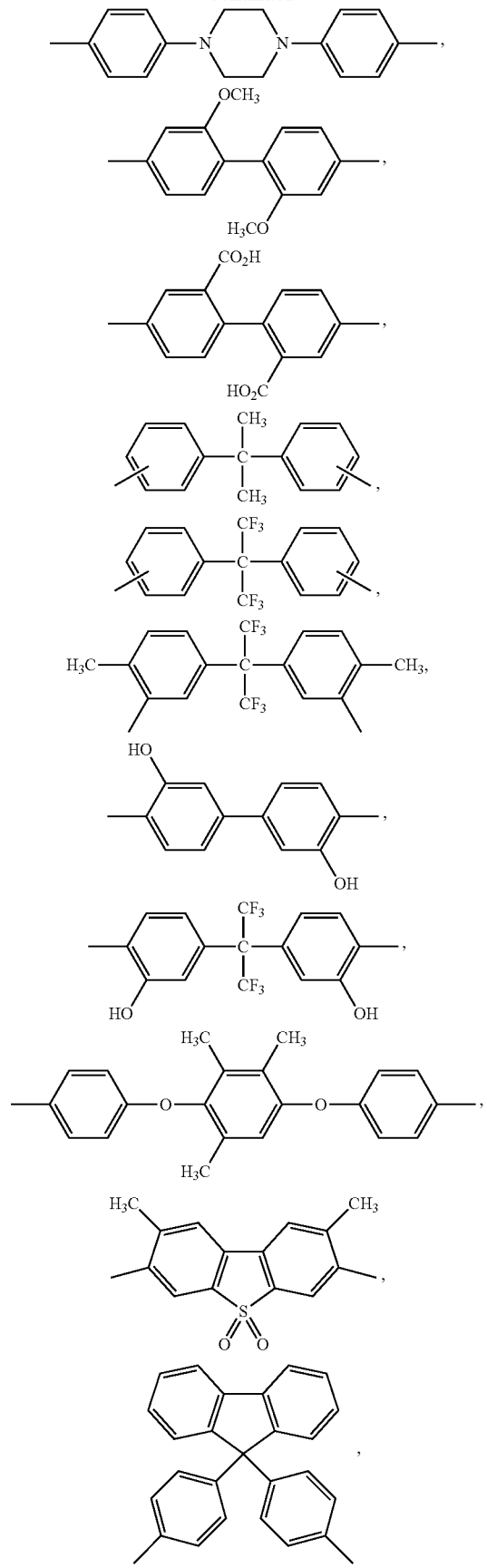

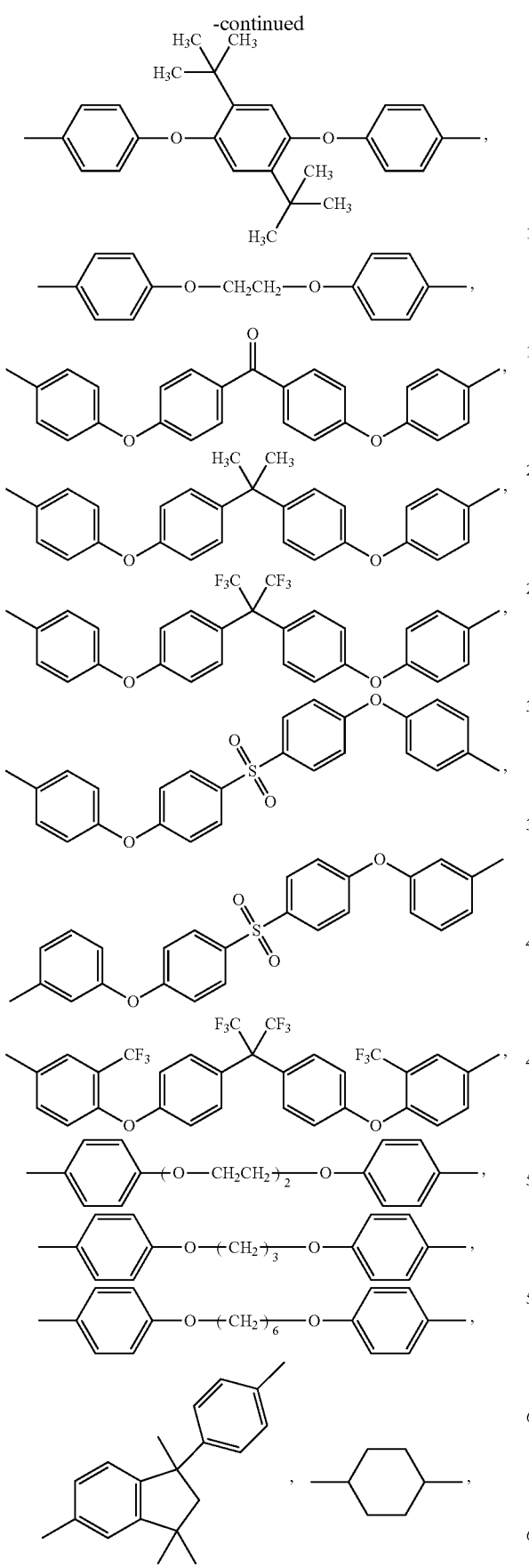
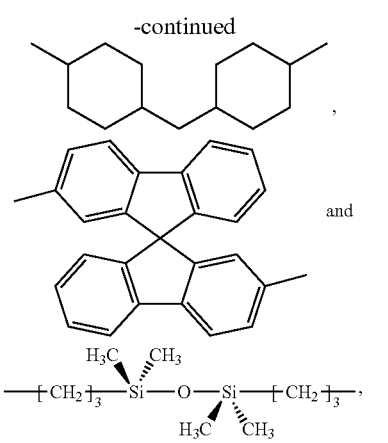
wherein:
 each a is independently an integer of 0 to 4; and
 each Z is independently hydrogen, methyl, trifluoromethyl or halogen.
7. The coating composition according to claim 6, wherein B is respectively a divalent organic group selected from the group consisting of the following groups:
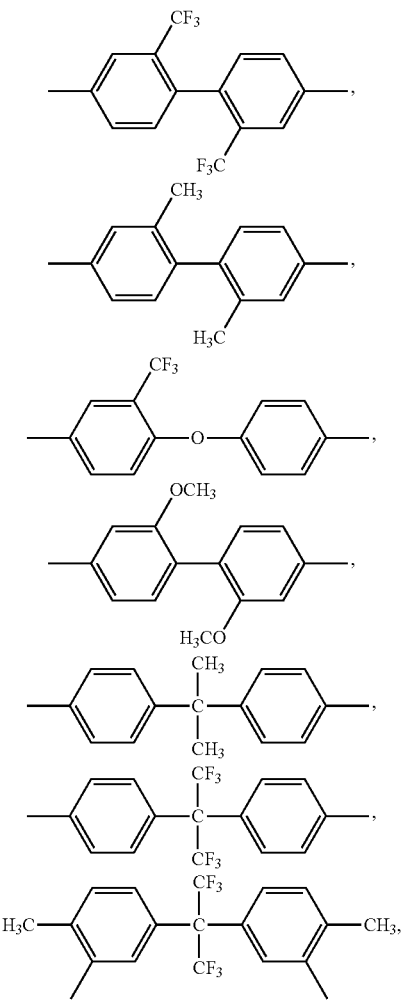

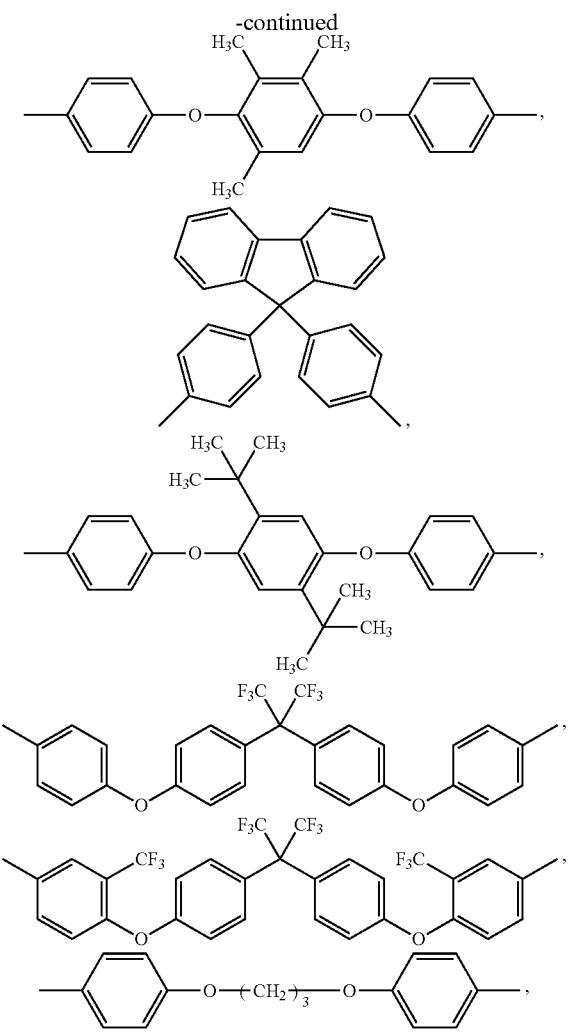
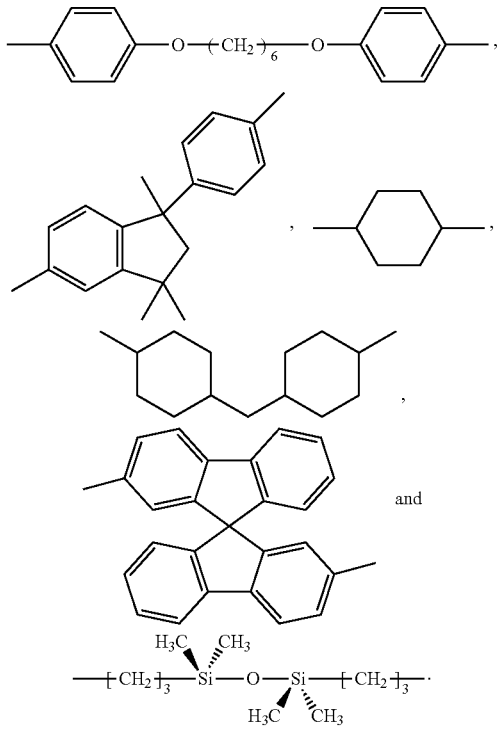
8. The coating composition according to claim 1, wherein n is an integer of 1 to 100.
9. A flexible device, comprising a thin film formed by the coating composition according to claim 1.
10. The coating composition according to claim 1, wherein the hardening agent is (1,3-bis(4,5-dihydrooxazol-2-yl)benzene).
* * * * *